United States Patent
Papanikolopoulos et al.

(10) Patent No.: US 6,548,982 B1
(45) Date of Patent: Apr. 15, 2003

(54) MINIATURE ROBOTIC VEHICLES AND METHODS OF CONTROLLING SAME

(75) Inventors: Nikolaos P. Papanikolopoulos, Minneapolis, MN (US); Donald G. Krantz, Eden Prairie, MN (US); Richard M. Voyles, North Oaks, MN (US); John A. Bushey, Eden Prairie, MN (US); Alan N. Johnson, Chanhassen, MN (US); Bradley J. Nelson, North Oaks, MN (US); Paul E. Rybski, Minneapolis, MN (US); Kathleen A. Griggs, Damascus, MD (US); Ellison C. Urban, II, Alexandria, VA (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 09/715,959

(22) Filed: Nov. 17, 2000

Related U.S. Application Data

(60) Provisional application No. 60/166,572, filed on Nov. 19, 1999.

(51) Int. Cl.[7] .................................................. B25J 9/18
(52) U.S. Cl. ............................ 318/568.11; 318/568.12; 901/50; 446/435; 446/470; 446/457
(58) Field of Search ...................... 318/568.11, 568.12, 318/568.16; 901/1, 27, 48, 50; 296/169, 97.13; 446/470, 457, 435

(56) References Cited

U.S. PATENT DOCUMENTS 4,402,158 A * 9/1983 Seki et al. ...................... 46/44
4,443,968 A * 4/1984 Law ............................ 446/462

(List continued on next page.)

FOREIGN PATENT DOCUMENTS

JP          10-693140         3/1998

OTHER PUBLICATIONS

Balch et al., "Behavior–based Formation Control for Multi–Robot Teams", *IEEE Transactions on Robotics and Automation,* 14(16):1–15 (1998).

Burgard et al., "Collaborative Multi–Robot Exploration," *IEEE International Conference on robotics and Automation (ICRA),* 2000 (6 pgs.).

(List continued on next page.)

*Primary Examiner*—Rita Leykin
(74) *Attorney, Agent, or Firm*—Mueting, Raasch & Gebhardt, P.A.

(57) ABSTRACT

A robotic vehicle capable of traveling over various terrain and traversing obstacles. In one embodiment, the vehicle includes a cylindrical body having two or more drive wheels coupled to the ends thereof. The wheels are selectively powered to propel the vehicle. The vehicle may further include a spring member which may be deflected to a first, stored position from a second, extended position. The spring member may be quickly released from the first, stored position such that it strikes the terrain with sufficient force to lift and propel the vehicle over or onto a proximate obstacle or object. Robotic vehicles of the present invention may also include one or more sensing devices operable to collect information. Electronics may further permit autonomous, semi-autonomous, and/or remote control of the vehicle. In still other embodiments, the robotic vehicle forms part of a multi-robot surveillance team. The robotic vehicles may be delivered to the desired location through the use of a deployment and communication apparatus which, in one embodiment, is a larger robotic vehicle. The deployment and communication apparatus may form part of the communication system between the robotic vehicles and a remote workstation.

53 Claims, 20 Drawing Sheets

U.S. PATENT DOCUMENTS

| | | | | | |
|---|---|---|---|---|---|
| 4,572,530 A | * | 2/1986 | Marino | ........................ | 180/209 |
| 4,575,304 A | | 3/1986 | Nakagawa et al. | ......... | 414/730 |
| 4,736,826 A | * | 4/1988 | White et al. | ............ | 191/12.2 A |
| 4,899,945 A | * | 2/1990 | Jones | ....................... | 242/420.6 |
| 4,913,458 A | * | 4/1990 | Hamilton | ..................... | 212/304 |
| 4,993,912 A | | 2/1991 | King et al. | .................. | 414/729 |
| 5,241,380 A | * | 8/1993 | Benson et al. | .............. | 358/108 |
| 5,350,033 A | * | 9/1994 | Kraft | .......................... | 180/167 |
| 5,473,364 A | | 12/1995 | Burt | ............................ | 348/47 |
| 5,551,545 A | * | 9/1996 | Gelfman | ................ | 191/12.2 A |
| 5,554,914 A | | 9/1996 | Miyazawa | ............. | 318/568.11 |
| 5,576,605 A | | 11/1996 | Miyazawa | ............. | 318/568.12 |
| 5,596,255 A | | 1/1997 | Miyazawa | ............. | 318/568.12 |
| 5,610,488 A | | 3/1997 | Miyazawa | ............. | 318/568.11 |
| 5,721,691 A | | 2/1998 | Wuller et al. | ............... | 364/572 |
| 5,759,083 A | * | 6/1998 | Polumbaum et al. | ... | 273/129 V |
| 6,101,951 A | * | 8/2000 | Sigel | ....................... | 104/138.2 |

OTHER PUBLICATIONS

Cao et al., "Cooperative Mobile Robotics: Antecedents and Directions", *Autonomous Robots, 4*(1):7–27 (1997).

Carts–Powell, "Spring–loaded Spies", [online]; *The New Scientist*, retrieved from the Internet on Jan. 4, 2000 at: <URLwww.newscientist.com/ns/19991113/newsstory1.html>, 3 pgs.

Defense Advanced Research Projects Agency (DARPA), "Distributed Robotics", [online]; retrieved from the Internet on Jan. 4, 2000 at: <URL:www.darpa.mil/MTO/DRobotics/index.html>, 2 pgs.

Defense Advanced Research Projects Agency (DARPA), "Distributed Robotics Using Reconfigurable Robots", [online]; retrieved from the Internet on Jan. 4, 2000 at: <URL:www.darpa.mil/MTO/DRobotics/98DROverviews/university–10.html>, 2 pgs.

Dillmann et al., "PRIAMOS: An advanced mobile system for service, inspection, and surveillance tasks", *Modelling and Planning for Sensor Based Intelligent Robot Systems*, vol. 21 of *Series in Machine Perception and Artificial Intelligence*, World Scientific, Singapore (1995).

Elfes, "Using Occupancy Grids for Mobile Robot Perception and Navigation", *IEEE Computer, 22*(6):46–57 (1989).

Everett et al., "From Laboratory to Warehouse: Security Robots Meet the Real World", *Int'l Journal of Robotics Research, 18*(7):760–768 (1999).

Fox et al., "Collaborative Multi–Robot Localization", *Proc. of the German Conference on Artificial Intelligence (KI)* Germany (date unknown) (12 pgs.).

Fox et al., "A probabilistic approach to collaborative multi–robot localization", *Autonomous Robots,8*:325–344 (2000).

Kajiwara et al., "Development of a mobile robot for security guard", *Proceedings of the 15th Int'l Symposium on Industrial Robots, 1*:271–278 (1985).

Kochan, "HelpMate to ease hospital delivery and collection tasks, and assist with security", *Industrial Robot, 24*(3):226–228 (1997).

Matarić, "Behaviour–based control: examples from navigation, learning, and group behavior", *Journal of Experimental and Theoretical Artificial Intelligence, 9*(2–3): 323–336 (1997).

Orwig, "Cybermotion's Roving Robots", *Industrial Robot, 20*(3):27–29 (1993).

Osipov et al., "Mobile robots for security", *Proceedings of the 1996 2nd Specialty Conference on Robotics for Challenging Environments*, RCE–II, pp. 290–295 (1996).

Parker, "On the design of behavior–based multi–robot teams", *Journal of Advanced Robotics, 10*(6):547–578 (1996).

Pellerin, "Twenty–first Century Sentries", *Industrial Robot, 20*(2):15–17 (1993).

Porteous, "Intelligent Buildings and Their Effect on the Security Industry", *Proceedings of the Institute of Electrical and Electronics Engineers 29th Annual 1995 International Carnahan Conference on Security Technology*, pp. 186–188, Sanderstead, Surrey, England (1995).

Pritchard et al., "Test and Evaluation of Panomaric Imaging Security Sensor for Force Protection and Facility Security", *Proceedings of the Institute of Electrical and Electronics Engineers 32nd Annual 1998 International Carnahan Conference on Security Technology*, pp. 190–195, Alexandria, VA. (1998).

Rybski et al., "Enlisting Rangers and Scouts for Reconnaissance and Surveillance", *IEEE Robotics & Automation Magazine*, pp. 14–24 (Dec. 2000).

Saitoh, "Mobile robot testbed with manipulator for security guard application", *Proc. of the IEEE Int'l Conference on Robotics and Automation, 3*:2518–2523, Nagoya, Japan (1995).

Weisbin et al., "Miniature robots for space and military missions", *IEEE Robotics and Automation Magazine, 6*(3):9–18 (1999).

* cited by examiner

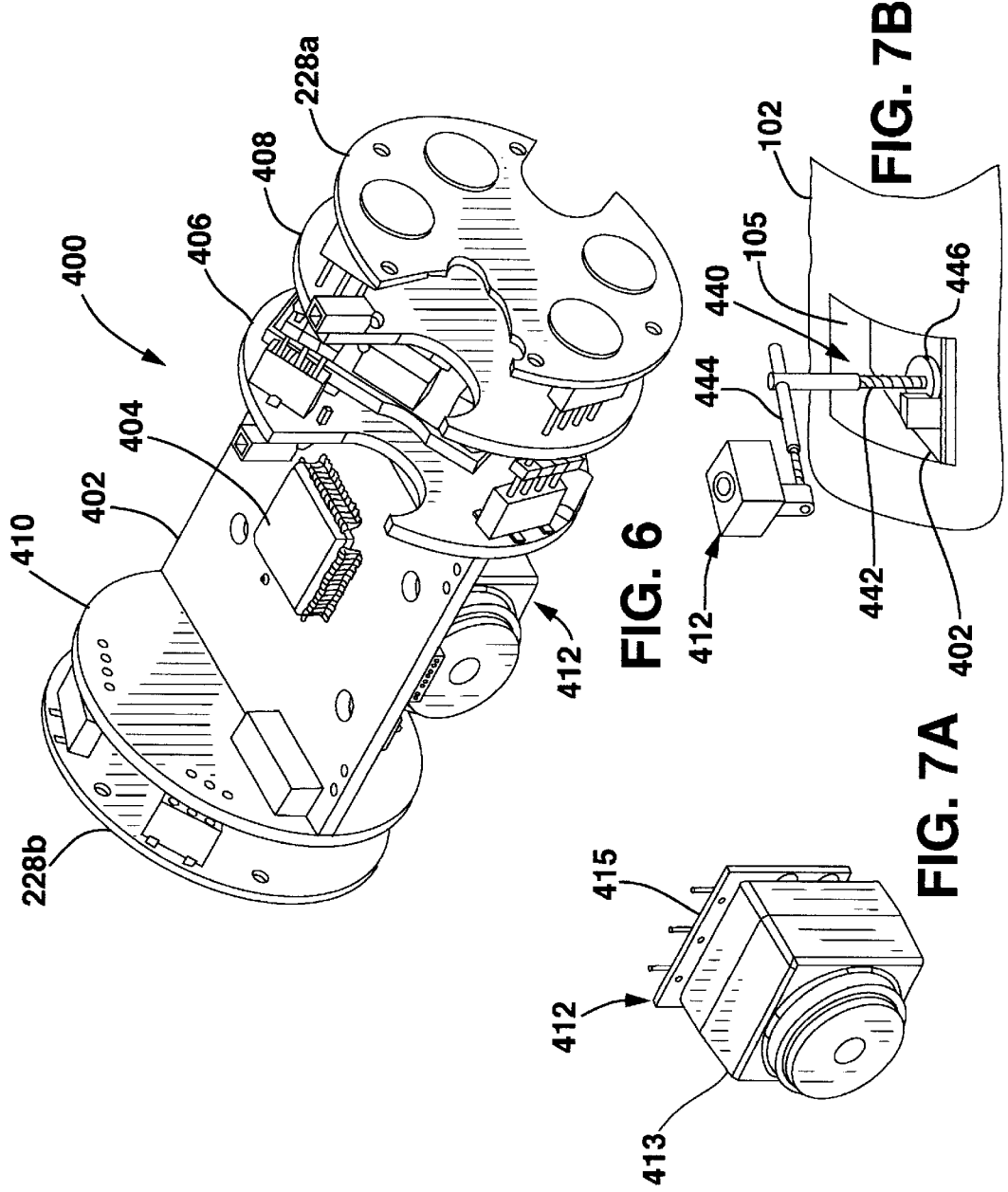

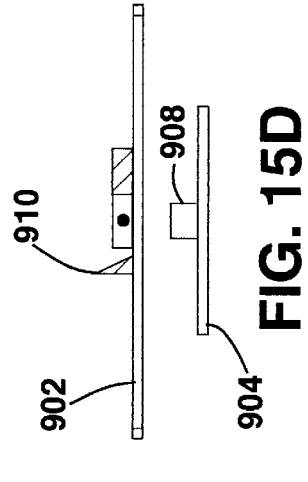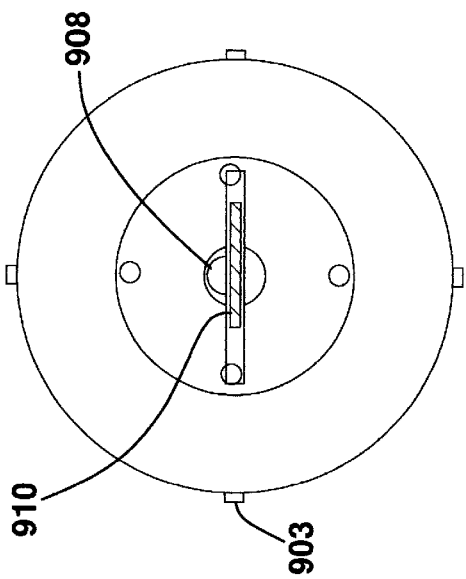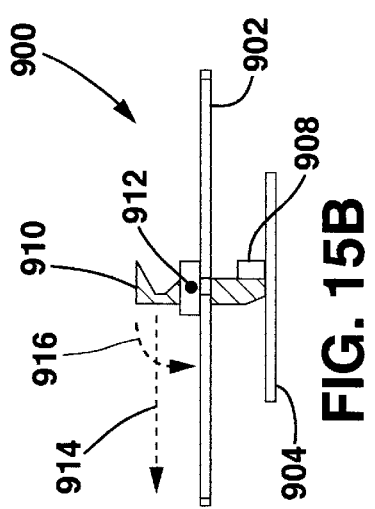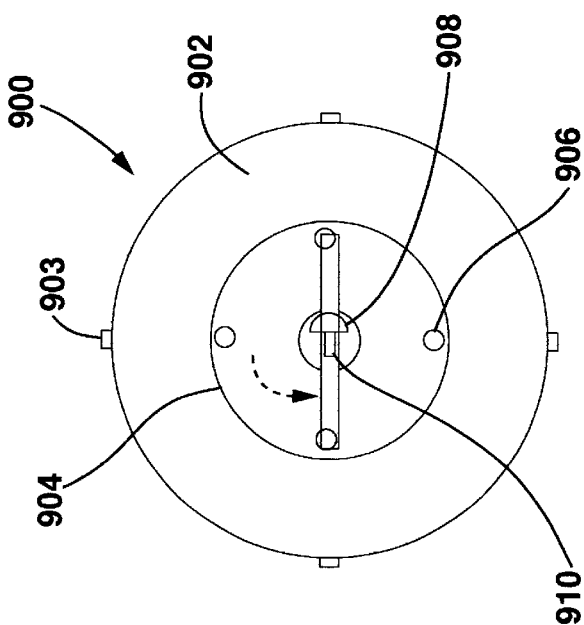

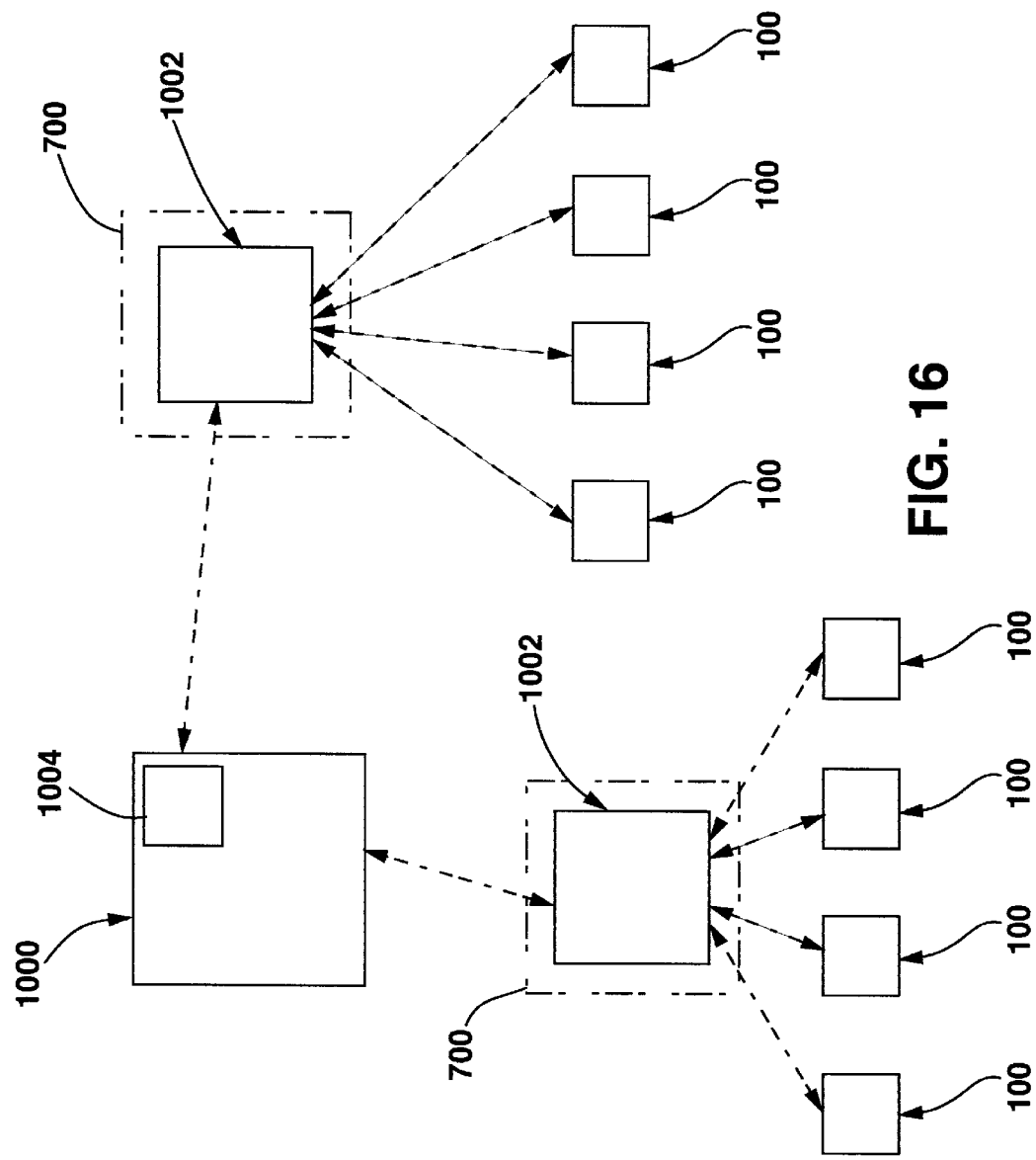

MINIATURE ROBOTIC VEHICLES AND METHODS OF CONTROLLING SAME

RELATED APPLICATIONS

This application claims the benefit of U.S. Provisional Patent Application Serial No. 60/166,572, filed 19 Nov. 1999, which is incorporated herein by reference in its entirety.

GOVERNMENT RIGHTS

The present invention was made with support from the Defense Advanced Research Projects Agency under Contract No. MDA972-98-C-0008. The U.S. government may have certain rights in this invention.

TECHNICAL FIELD

The present invention relates to the field of robotics. More particularly, the present invention pertains to miniature robotic vehicles able to traverse various terrain and methods and systems for operating and controlling such vehicles.

BACKGROUND OF THE INVENTION

Reconnaissance, surveillance, and security monitoring activities (hereinafter referred to collectively as "surveillance") have become an integral investigation tool for both military and civilian organizations alike. While by no means a complete list, tasks such as hostage rescue, terrorist response, drug raids, building searches, facility monitoring, and site contamination investigation may all benefit from information provided by surveillance systems.

With the exception of human security guards, perhaps the most recognized surveillance systems are those that are generically referred to herein as "static" systems. Static systems typically comprise one or a plurality of fixed sensing devices such as video cameras, motion sensors, and perimeter detectors. While these devices are more than adequate for their intended application, drawbacks do exist. For instance, static devices, e.g., video cameras, do not always provide the range of coverage needed for an unanticipated surveillance situation. Further complicating this problem is the fact that static sensing devices are difficult to quickly reposition, e.g., human intervention is generally required to relocate the sensing device or to adjust its field of detection. Still other problems with conventional static systems include the routing of collected data to a single or, alternatively, to a limited number of operation stations. Unfortunately, in many military and law enforcement scenarios, these operation stations may be inaccessible by the surveillance team.

One solution that overcomes some of these problems is realized with the use of mobile robots. A mobile robot provides locomotion to the sensing devices and may further permit at least some level of autonomy. An example of such a robot used in a security role is described in *Development of a Mobile Robot for Security Guard*, Kajiwara et al., *Proceedings of the 15th International Symposium on Industrial Robots*, vol. 1, pp. 271–278, 1985. The system described by Kajiwara is a relatively large, independent robot developed to execute a predetermined task, which in this case, is to conduct the "rounds" of a human security guard. Other such systems are commercially available (see e.g., *HelpMate to Ease Hospital Delivery and Collection Tasks, Assist with Security*, Kochan, *Industrial Robot*, vol. 24, no. 3, pp.226–228, 1997; and *Cybermotion's Roving Robots*, Orwig, *Industrial Robot*, vol. 20, no. 3, pp.27–29, 1993).

Systems based on one or more independent robots do not permit coordinated monitoring of more than one area simultaneously. Further, the size of these robots makes them difficult to conceal, a disadvantage in hostile or covert operations. Size limitations may also prevent these robots from investigating smaller areas. Still further, many of these security robots are programmed to operate only within a defined facility, e.g., building. As a result, rapid deployment of such robots into a new or unfamiliar environment may be difficult.

To address some of these issues, multiple robot platforms have been suggested. Because of the inherent advantages of multiple robots, surveillance of more than one area (or monitoring a single area from more than one vantage point) is possible. Examples of multiple robot systems are discussed in *Cooperative Mobile Robotics: Antecedents and Directions*, Cao, et al., *Autonomous Robots*, vol. 4, pp. 7–27; 1997. Exemplary functions of such multiple robot systems include safe-wandering and homing (see e.g., *Behavior-Based Control: Examples from Navigation, Learning and Group Behavior*, Matarić, *Journal of Experimental and Theoretical Artificial Intelligence*, vol. 9 (2–3), pp. 323–336, 1997) and janitorial service (see e.g., *On the Design of Behavior-Based Multi-Robot Teams*, Parker, *Journal of Advanced Robotics*, vol. 10, no. 6, pp. 547–578, 1996). While effective for their intended purpose, many multiple robot systems do not address rapid deployment of multiple robots into unfamiliar surroundings for such purposes as surveillance, reconnaissance, and the like.

SUMMARY

The present invention provides ground-engaging robotic vehicles capable of rapid and covert deployment into most any environment and methods of controlling such vehicles. Generally speaking, vehicles of the present invention are preferably compact so that they may operate virtually undetected. They may further be highly mobile and able to traverse obstacles of relatively substantial height. In some embodiments, one or more of these vehicles is further able to collect and relay real-time data to a remote computer. Other advantages are described herein.

In one embodiment, a ground-engaging robotic vehicle is provided comprising a body and two or more ground-engaging members coupled to the body. The ground-engaging members may be operable to propel the robotic vehicle across a surface. A spring member may also be provided and coupled to the body. The spring member may be movable between at least a first, stored position and a second, extended position.

In another embodiment, a method for traversing one or more surfaces with a ground-engaging, robotic vehicle is described. The ground-engaging, robotic vehicle may include a body, at least a first and a second ground-engaging member operatively coupled to the body, and a spring member coupled to the body. The spring member may be movable between at least a first, stored position and a second, extended position. The method further includes energizing one or both of the first and second ground-engaging members so that the ground-engaging robotic vehicle is propelled across a surface.

In yet another embodiment, a ground-engaging robotic vehicle is provided. The vehicle may include a body and two or more rotatable, ground-engaging wheels coupled to the body. The ground-engaging wheels may be operable to propel the robotic vehicle across a surface. The robotic vehicle may further include a spring member coupled to the body, where the spring member is movable between at least a first, deflected position and a second, undeflected position. The robotic vehicle may further include a retraction apparatus operable to position the spring member in the first, deflected position, the second, undeflected position, or anywhere in between.

In still yet another embodiment, a method of traversing an obstacle with a ground-engaging robotic vehicle is provided. The method may include providing a ground-engaging, robotic vehicle where the vehicle includes a body; at least a first and a second ground-engaging wheel operatively coupled to the body; and a spring member coupled to the body, the spring member movable between at least a first, deflected position and a second, undeflected position. The method may further include locating the ground-engaging robotic vehicle upon a surface proximate an obstacle and positioning the spring member in the first, deflected position. The spring member may then be released from the first, deflected position, whereby it strikes the surface with sufficient force to propel the ground-engaging vehicle over or onto the obstacle.

The above summary of the invention is not intended to describe each embodiment or every implementation of the present invention. Rather, a more complete understanding of the invention will become apparent and appreciated by reference to the following detailed description and claims in view of the accompanying drawings.

BRIEF DESCRIPTION OF THE DRAWINGS

The present invention will be further described with reference to the drawings, wherein:

FIG. 6 is a partial perspective view of the robotic vehicle of FIG. 1 showing an electronics structure in accordance with one embodiment of the invention;

FIG. 7A is a perspective view of an exemplary video camera assembly for use with the robotic vehicle of FIG. 1;

FIG. 7B is a diagrammatic view of a tilt/swivel base in accordance with one embodiment of the invention, the tilt/swivel base for supporting the video camera assembly;

FIG. 9A illustrates a "wheel rotate" command; FIG. 9B illustrates a "retract spring member" command; and FIG. 9C illustrates a "vehicle jump" command;

FIG. 10A illustrates the member before retraction; FIGS. 10B illustrates the spring member after retraction to its stored and latched position; FIG. 10C illustrates release of the cable; and FIG. 10D illustrates release of the spring member;

FIGS. 14A–14B are perspective views of a protective casing in accordance with one embodiment of the invention, wherein FIG. 14A illustrates a first, tension end of the protective casing; and FIG. 14B illustrates a second, release end;

FIGS. 15A–15D illustrate an exemplary apparatus for releasing the protective casing of FIGS. 14A–14B from the robotic vehicle, wherein FIGS. 15A–15B illustrate the release apparatus in a latched position and FIGS. 15C–15D illustrate the release apparatus in an unlatched position;

FIG. 16 is a block diagram illustrating a software architecture for controlling one or more robotic vehicles in accordance with one embodiment of the invention.

DETAILED DESCRIPTION OF EXEMPLARY EMBODIMENTS

Figure 1:
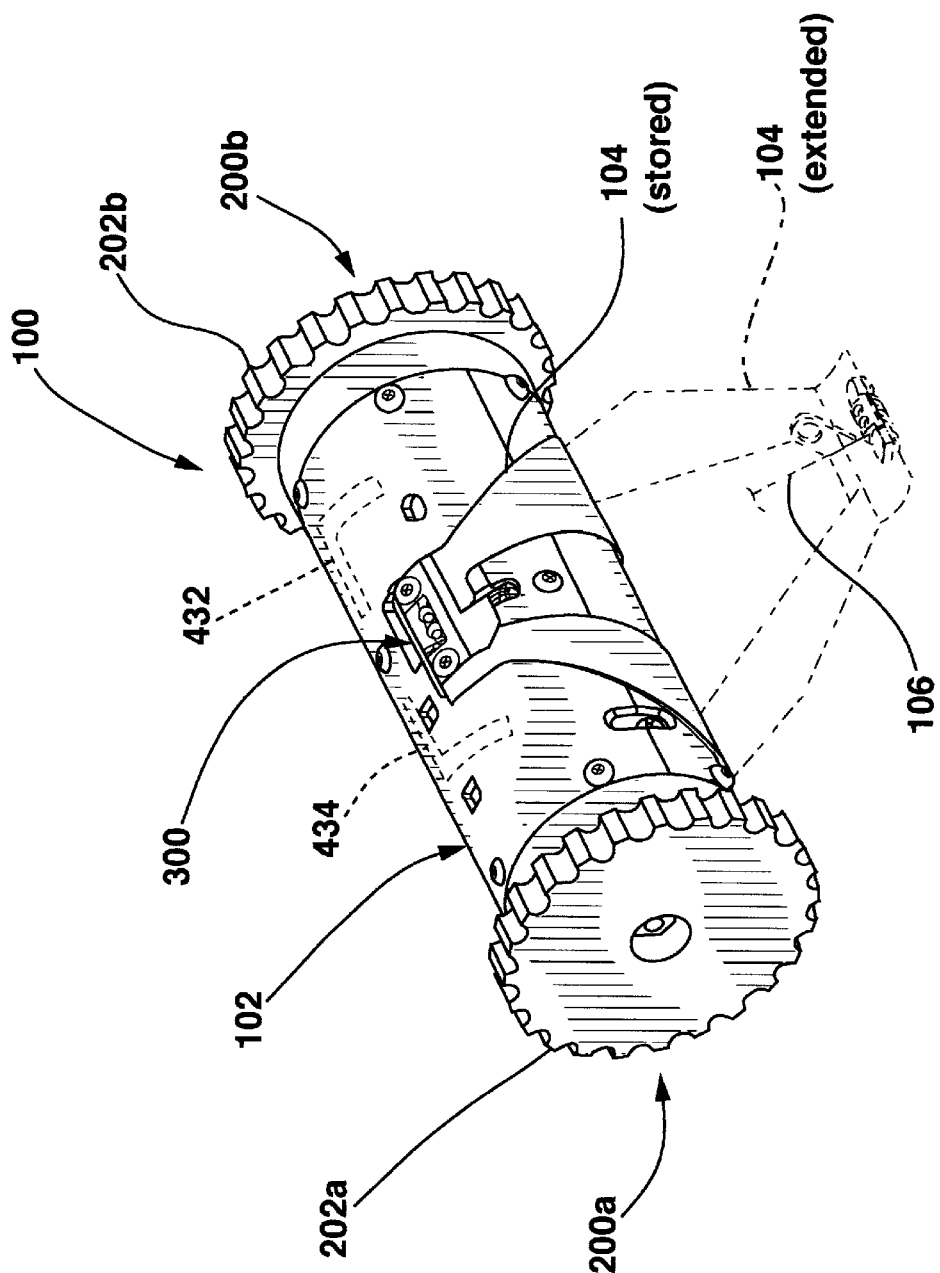
FIG. 1 is a perspective view of a robotic vehicle in accordance with one embodiment of the invention, the vehicle having a spring member shown both in a first, stored position and in a second, extended position (the latter shown in broken lines)

In the following detailed description of the embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

As described herein, the present invention is directed to miniature robotic vehicles (also referred to herein as "robots") and methods for their use either alone or, alternatively, as part of a multi-unit, robotic system. While advantageous in many applications, one role for which these apparatus and methods are particular beneficial is surveillance/reconnaissance missions. In this role, a robotic system deploying multiple robots provides inherent advantages over single unit systems. For example, with multi-unit systems, individual units may be expendable without jeopardizing the overall mission. Further, multi-unit systems yield improved coverage of a surveillance target by providing information from multiple locations.

In some embodiments, the robotic vehicles are part of a hierarchal distributed architecture that may include at least one deployment and communication apparatus used to deploy and/or coordinate the behaviors of the robotic vehicles. The robotic vehicles may communicate primarily with the deployment and communication apparatus which, in turn, may collect and present data to a remote computer.

While described herein as incorporating communication electronics on a deployment device, other embodiments may utilize one apparatus for deployment and another apparatus for communication. Some embodiments of the invention may further utilize multiple deployment and communication apparatus to coordinate activities of even large numbers of robotic vehicles. Other embodiments, however, do not require the use of an intermediate deployment and communication apparatus at all. That is, in some embodiments, the robotic vehicles may communicate directly with the remote computer and/or may operate semi-autonomously.

The term "remote computer" as used herein may include most any device capable of communicating with the robotic vehicles. For instance, the remote computer may be a fixed or mobile computer system, e.g., a truck-mounted personal computer (e.g., desktop or notebook) or minicomputer. Alternatively, the remote computer may be a handheld computer, e.g., a computer based on the Palm OS developed by Palm, Inc., or on the Windows CE platform developed by Microsoft Corp. In still other embodiments, the remote computer may include a portable display device, e.g, a head-mounted mini-display, accompanied by an input device, e.g., a joystick, trackball, or voice command module. The term "remote computer" may further encompass the deployment and communication apparatus as described herein. The exact configuration of the remote computer is therefore not limiting and most any device capable of communicating, either directly or indirectly, with the robotic vehicle is within the scope of the invention.

For the sake of brevity, robotic vehicles and methods of the present invention are described herein with exemplary reference to civilian/military surveillance and reconnaissance missions. However, this is not to be interpreted as limiting as apparatus and methods of the present invention are advantageous to most any mobile robot application. For instance, the apparatus and methods of the present invention may find application in: space and underwater exploration, mining applications, construction or industrial inspection (e.g., to inspect crawl spaces, waste inspection and cleanup, etc.), emergency handling, security monitoring, rescue missions (e.g., hostage situations or investigation into collapsed or otherwise damaged structures), entertainment applications (e.g., using the vehicle as the underlying mobility system for a special effect), and robotic toys to name a few.

With this general overview, the following discussion will address embodiments of the robotic vehicle, systems employing the same, and methods for using the robotic vehicle in exemplary surveillance scenarios. Once again, while some of these embodiments are described with specificity, they are nonetheless intended to be exemplary. Those of skill in the art will recognize that other embodiments are possible without departing from the scope of the invention.

The following description is organized by headings and subheadings for organization only. Accordingly, the particular headings/subheadings are not intended to limit in any way the embodiments described therein, i.e., alternative embodiments may be found elsewhere in the specification. Thus, the specification is to be viewed as a whole.

Robotic Vehicle

Mechanical Systems

FIG. 1 illustrates a mobile robotic vehicle 100 in accordance with one embodiment of the invention. Generally speaking, the vehicle 100 is a miniature robot adapted to maneuver into most any area. Because of its small size, the vehicle is further able to remain virtually undetected during much of its operation. While the actual size and shape of the vehicle 100 may vary depending on the particular application for which it is adapted, it is, in one embodiment, about 1.60 inches (40 mm) in diameter and about 4.0 to about 4.7 inches (100–120 mm) long. Nonetheless, the invention described herein is scalable and thus encompasses vehicles of most any diameter and length. Furthermore, while the cylindrical shape described herein has advantages, e.g., launching from a round, barreled device such as a grenade launcher or other delivery apparatus as further described below, the invention is not limited to cylindrical form factors. Stated alternatively, other shapes, e.g., rectangular cross-sections, are also possible without departing from the scope of the invention.

To provide adequate mobility over most any terrain, the vehicle 100 may include ground-engaging traction members, e.g., wheels 202. The vehicle 100 may also include, as further described below, a spring member 104 which allows the vehicle to "jump" over (or onto) obstacles, e.g., over a gate or onto an obstacle such as a step, encountered during operation. While the actual spring member may be designed to provide specific jump characteristics, it provides, in one embodiment, the ability to propel the vehicle 100 from a relatively hard surface (e.g., concrete, asphalt) through a trajectory height (e.g., vertical rise) of about 12 to about 15 inches (30–38 cm) and a trajectory length (horizontal distance) of about 13 inches to about 16 inches (about 33–40 cm). The jump characteristics may be altered in numerous ways, e.g., by adjusting the dimensions, configuration, and/or deflection of the spring member 104.

To permit the collection of data, the vehicle 100 may include one or more on-board sensing devices. Data collected from these sensing devices may be transmitted to the remote computer utilizing on-board communication circuits which are further described below. Other circuits may allow the vehicle to operate autonomously, semi-autonomously, remotely controlled, or by any combination thereof.

In FIG. 1, a robotic vehicle 100 is shown having a cylindrical body 102 having a wheel 202 located at each end. While illustrated with two wheels 202, other embodiments may include any number of wheels depending on the particular vehicle geometry. To provide shock absorption and reduce rolling noise, the wheel 202 may be made from a soft material, e.g., foam rubber or neoprene. A softer material may also provide increased traction on hard, smooth surfaces as well as permit collapse of the wheels for launching, e.g., collapse for placement within a barrel-type delivery device as further described herein. However, for operation in other environments, wheels of most any material and tread design are possible.

Throughout the drawings, instances in which generally similar or identical parts and assemblies, e.g., wheels 202, are described, the use of "a" and "b" suffixes may be used for clarity. However, such parts may be generically or collectively identified without the suffix where distinguishing the parts/assemblies is unnecessary.

Figure 2:
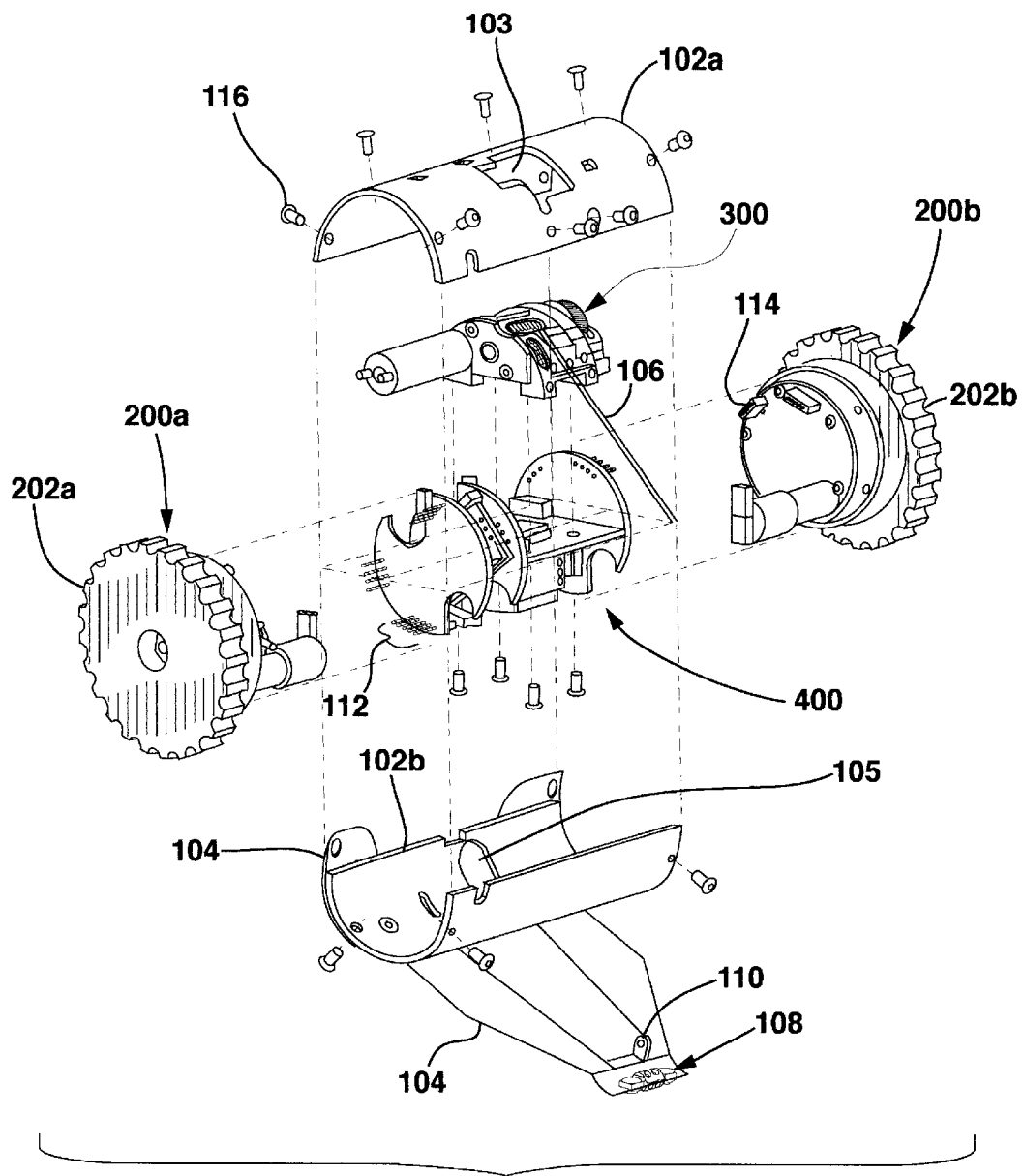
FIG. 2 is an exploded perspective view of the robotic vehicle of FIG. 1.

The spring member embodiment shown in FIG. 1 is a generally V-shaped piece of resilient, spring steel that is coupled to the body 102 as illustrated in FIG. 2. The spring member 104 can be moved, e.g., deflected, between at least a first, stored position (shown in solid lines in FIG. 1) and a second, extended position (shown in broken lines). Because the spring member 104 is substantially resilient, it is consistently biased towards the second, extended position. The spring member 104 may be formed to match the exterior profile of the body 102 at the attachment points, e.g., the portion of the spring member that couples to the body 102 may be formed into a semi-cylindrical shape as shown in FIG. 2.

A flexible cable 106, such as a wire rope or nylon line, may extend generally from a cable anchor assembly 108 at the apex of the spring member 104 to a retraction apparatus 300 coupled to the body 102 as shown in FIG. 2. The retraction apparatus 300, explained in more detail below, permits selective retraction and extension of the cable 106. When the cable 106 is retracted, it draws the spring member 104 towards the first, stored position (see FIG. 1). When the cable 106 is extended, the spring member 104 may return towards its second, extended position (see FIG. 1).

FIG. 2 illustrates the robotic vehicle of FIG. 1 in an exploded view. As illustrated, the body is shown as including two half cylinder elements 102a and 102b, which, when coupled, form the body 102. An aperture 103 permits the cable 106 to pass from the retraction apparatus 300, which is preferably mounted within the body 102, to the cable anchor assembly 108 on the spring member 104. Preferably coupled to the spring member 104 proximate the anchor assembly 108 is a latch member 110. The latch member 110 is engageable with a latching mechanism in the retraction apparatus 300 (explained in more detail below with reference to FIGS. 4 and 5) to permit selective latching of the spring member 104 in the first, stored position.

Figure 3:
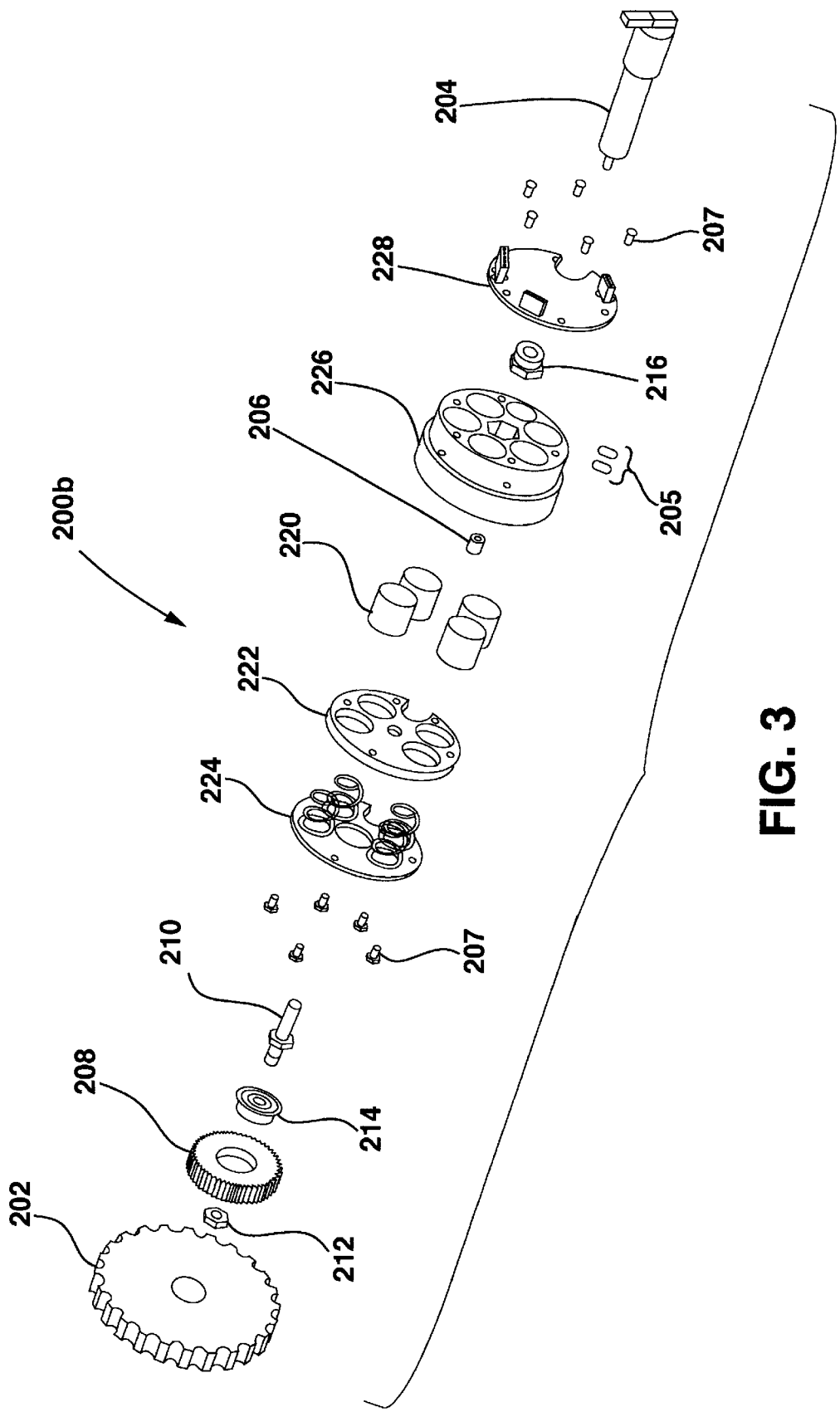
FIG. 3 is an exploded perspective view of a drive assembly in accordance with one embodiment of the present invention.

To provide rolling mobility, a drive assembly 200 may be attached to each end of the body 102 as shown in FIG. 2. FIG. 3 illustrates an exploded perspective view of the drive assembly 200b. In this embodiment, the drive wheel 202 receives power from a drive motor 204. The drive motor 204 drives a pinion gear 206 which, in turn, turns a drive gear 208 coupled to the wheel 202. The drive wheel 202 may be attached to the drive gear 208 with an adhesive layer (not shown). However, other attachment methods, e.g., fasteners, may also be used. A bearing 214 may be coupled, e.g., press fit, into the drive gear 208 and secured to an axle 210 with a nut 212. The axle 210 then passes through a housing 226 and is held relative thereto by a lock nut 216.

The drive assembly 200 further includes a power source to provide power to both the drive motor 204 and other electrical components of the robotic vehicle 100. The power source may include battery cells 220 held in place by battery retainers 222 and 224. While shown with four battery cells 220, other embodiments may include additional cells as space permits and power requirements dictate. For example, in the illustrated embodiment, drive assembly 200a (not shown) and drive assembly 200b (shown) may both include four cells 220. Moreover, each assembly 200a and 200b may include the same or a different number of cells therein, e.g., assembly 200a may include five cells while assembly 200b may include more, less, or the same number of cells.

By providing independent drive assemblies 200, the wheels 202 of the vehicle 100 may be powered independently. For example, the wheels may be driven at generally the same speed in the same direction. For directional adjustments, one wheel may be driven slower. For sharp turns, one wheel may be stopped or even powered in the opposite direction. Accordingly, the separate drive assemblies 200 provide the vehicle 100 with versatile directional control.

A printed circuit board (PCB) 228 may also be provided opposite the retainer 224. The PCB 228, in one embodiment, includes a power supply to regulate voltage output from the battery cells 220.

To secure the individual components of the drive assembly 200, a plurality of fasteners 207 may be used. Similarly, one or more fasteners, e.g., set screws 205, may be used to position and retain the drive motor 204 relative to the drive housing 226. When assembled, the drive assembly 200 appears as generally illustrated in FIG. 2.

Figure 4:
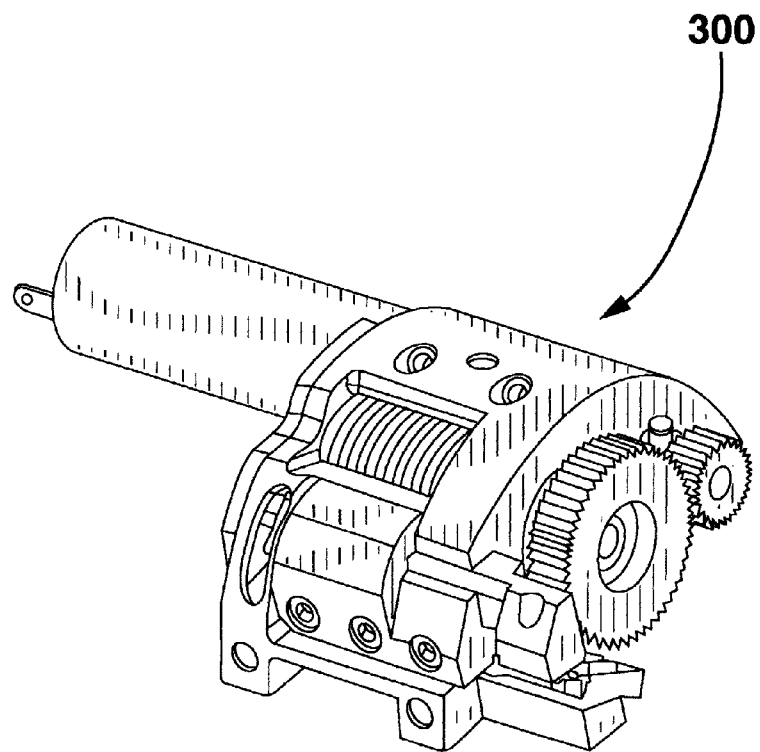
FIG. 4 is a perspective view of a retraction apparatus in accordance with one embodiment of the present invention.
Figure 5:
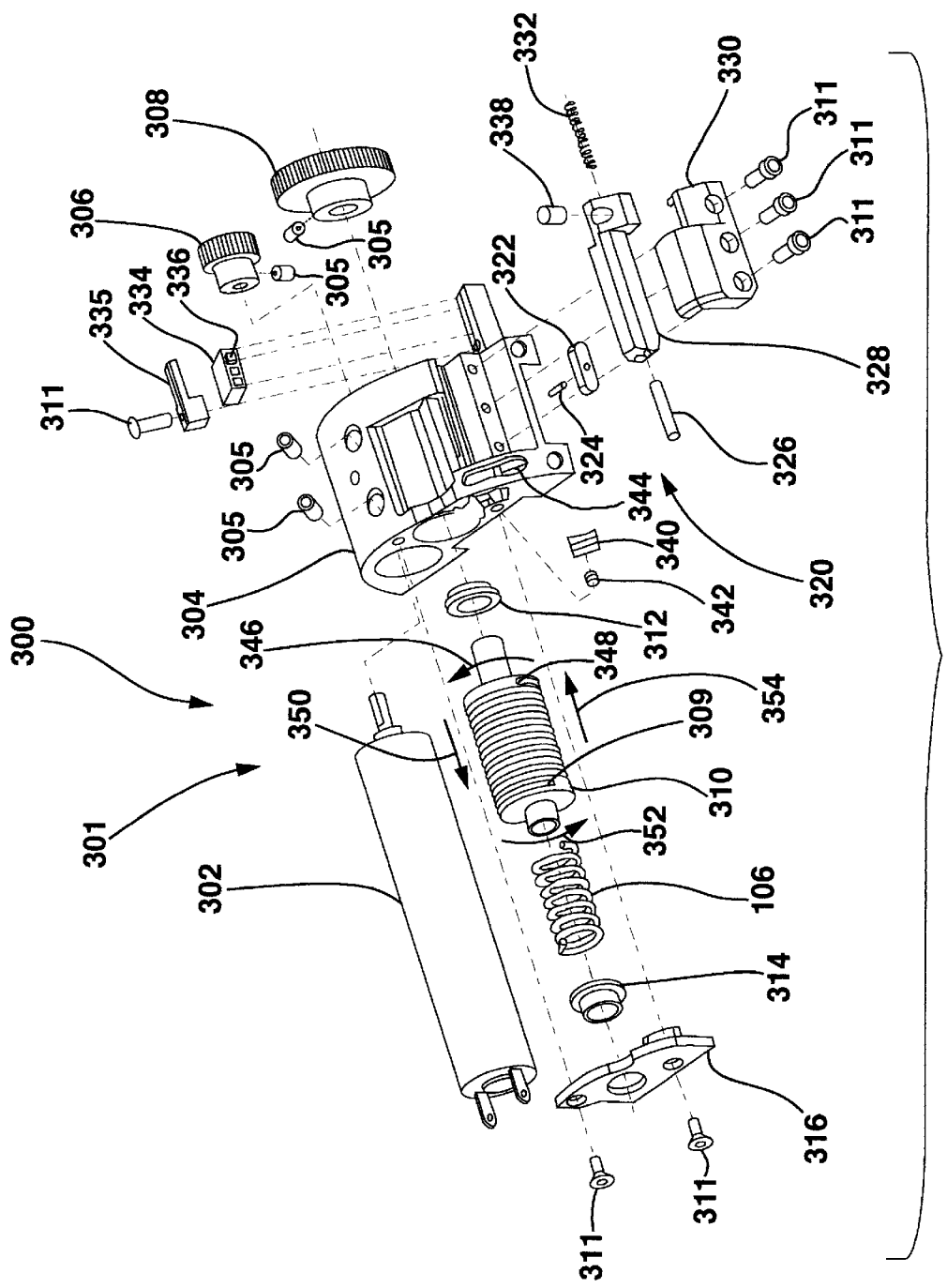
FIG. 5 is an exploded perspective view of the retraction apparatus of FIG. 4.

FIG. 4 shows an enlarged perspective view of the retraction apparatus 300 while FIG. 5 illustrates the same in an exploded view. The apparatus 300 includes a retraction mechanism 301 powered by a motor 302 secured within a body 304 by fasteners, e.g., set screws 305. Coupled to the drive output shaft of the motor is a pinion gear 306 which drives a driven gear 308 coupled to a spool 310. The gears 306 and 308 may also be secured by fasteners, e.g., set screws 305. The spool 310, which in one embodiment is cylindrical in shape and includes a left-hand continuous groove or thread 309, is held within the housing 304 (see FIG. 4) by bearings 312 and 314, retainer 316, and fasteners 311. The cable 106 preferably fits within the helical groove 309.

In addition to the retraction mechanism 301, the retraction apparatus 300 further includes a latching mechanism 320. The latching mechanism may include a shuttle block 322 having dowel pin 324 securely coupled thereto. The shuttle block 322 rides within a groove (not shown) on the back of a slide member 328 which itself is slidingly retained between the body 304 and a slide retainer 330 with fasteners 311. A spring 332 biases the slide member 328 as further described below. A switch, e.g., proximity switch 334, may also be included and held in place by a retainer 335 and fastener 311. The switch 334 may further include a button 336 engageable by a fastener, e.g., tapered set screw 338, coupled to the slide member 328. In one embodiment, the switch may be normally open. The latching mechanism may further include a slot 344 having a button 340 biased by a spring 342 therein.

When the vehicle is commanded to retract the spring member 104, the motor 302 may rotate the spool 310 in a first direction 346 (counterclockwise when viewed longitudinally from the left side of FIG. 5). The cable 106 may be anchored at a groove termination 348 proximate the rightmost end of spool 310. When the spring member 104 is in the second, extended position (See FIG. 1), the cable 106 may be wound approximately halfway along the spool 310, i.e, the cable 106 may occupy approximately half of the total groove 309 length. As the spool 310 turns in the first direction 346, the cable 106 is further wound onto the spool 310, e.g.,, wound towards the leftmost end. Pin 324, which rides in the groove 309 of the spool 310, drives the shuttle 322 in the direction 350, i.e., towards the left in FIG. 5. The slide 328, however, remains stationary due to the biased engagement of the attached pin 326 with the button 340.

As the spool 310 continues to rotate, the spring member 104 is deflected towards the first, stored position such that the latch member 110 (see FIG. 2) enters the slot 344. As the latch member enters the slot 344, it contacts the button 340 and begins to compress the latter against the biasing force of the spring 342. Once the button 340 has been sufficiently depressed, the slide member 328, biased by the spring 332, causes the pin 326 to engage the latch member 110, thereby retaining the spring member 104 in the first, stored position. The slide 328 may move without interference from the shuttle 322 because the dimensions of the groove (not shown) on the back of the slide 328 permit relative movement therebetween. As the pin 326 and slide member 328 engage the latch member 110, the set screw 338 may disengage from the button 336 of the switch 334, changing the switch status, e.g., from opened to closed, to indicate that the spring member is in the first, stored position. Once the switch 334 so indicates, the motor 302 is de-energized.

To release the spring member 104, the motor 302 may drive the spool 310 in the direction 352 (i.e., clockwise when viewed longitudinally from the left in FIG. 5). As the spool 310 rotates, the cable 106 may loosen around the spool, e.g., it moves from being tightly wound around the inner diameter of the groove 309 to being loosely wound within the groove, e.g., the cable 106 "expands" such that it basically lies near the outer diameter of the spool 310. The groove 309 is advantageous in that it reduces the chances of tangling of the cable 106 during operation. The cable may, alternatively, spool out of the apparatus 300 as generally shown in FIG. 10C. The spring member 104, however, remains in the first, stored position due to the engagement of the latch member 110 with the pin 326. By providing slack in the cable 106, rapid movement of the spring member 104 from the first, stored position towards the second, extended position (see FIG. 1) may occur without substantial interference from the cable 106.

As the spool 310 is further driven in the direction 352, the pin 324 (which rides within the groove 309) drives the shuttle 322 in the direction 354, i.e., to the right in FIG. 5, along the groove (not shown) on the backside of the slide 328. Eventually, the shuttle 322 contacts the end of the groove of the backside of the slide 328 where it then begins to push the slide 328 in the direction 354, thus retracting the pin 326 from the latch member 110 of the anchor assembly 108 (see FIG. 2). When the pin 326 is sufficiently withdrawn from the latch member 110, the spring foot 104 is released. The motor 302 continues to drive until the set screw 338 again engages the button 336 of the switch 334. As the pin 326 withdraws from the latch member 110, the spring 342 biases the button 340 outwardly such that it is ready for the next retraction and latching cycle.

The frictional forces associated with the embodiment of the retraction apparatus 300 illustrated in FIG. 5 permit the gear train to resist back-driving when the motor 302 is de-energized at an intermediate position, i.e., the load of the deflected spring member 104 will not back-drive the motor if the motor is de-energized when the spring member 104 is in an intermediate position; e.g., between the first, stored position and the second, extended position. However, other embodiments of the retraction apparatus may permit back-driving of the system where such a characteristic may be advantageous.

While described with particularity above, those of skill in the art will recognize that the particular configurations of the mechanical systems are only exemplary, i.e., other configurations are certainly possible without departing from the scope of the invention. For example, the retraction apparatus 300 may be replaced by other winch-like mechanisms that are able to retract and preferably latch the spring member as described herein.

Electronic Systems

To control the robotic vehicle 100, one or more electronic systems may be provided. For example, FIG. 6 illustrates a main PCB assembly 400 in accordance with one embodiment of the invention. The main PCB assembly 400 may include a main processor board 402 having a main processor 404 coupled thereto. One or more additional PCBs may also be coupled to the main processor board 402 to provide the vehicle 100 with specific capabilities. For example, a sensor device, e.g., video camera assembly 412, may be coupled to the main processor board 402 as shown (the video camera assembly 412 is further illustrated in FIG. 7A). Other sensor devices in lieu of or in addition to the video camera assembly 412 are also possible. For instance, passive infrared sensors, MEMS (microelectromechanical systems) vibration sensors, MEMS gas sensors, audio sensors (e.g., microphones), radar units, and environmental sensors (e.g., temperature sensors) may also be included. The selection of the actual sensor device or sensor suite is dependent on the anticipated application of the vehicle 100. Preferably, the PCB assembly 400 includes hardware for supporting and connecting a wide variety of sensors so that the robotic vehicle 100 can be quickly converted from one application to another.

A radio processor board 406 and a radio board 408 may be coupled proximate one end of the main processor board 402 as shown in FIG. 6. The radio processor board 406 and radio board 408 contain circuits necessary for communication between the robotic vehicle 100 and a remote computer. Proximate the opposite end of the main processor board 402 is a magnetometer board 410, which, among other capabilities, may provide magnetic heading and further detect tilt of the vehicle 100. FIG. 6 further illustrates the PCB power supplies 228 which form part of the respective drive assemblies 200 (see FIG. 2). In the illustrated embodiments, boards 406, 408, 410, and 228 are preferably coupled to the main processor board 402 in a perpendicular orientation and may further be of generally the same size and shape as the interior of the body 102, e.g., circular. This configuration allows for efficient and compact packaging of the vehicle electronics while, at the same time, providing a structural framework for the robotic vehicle.

Figure 8:
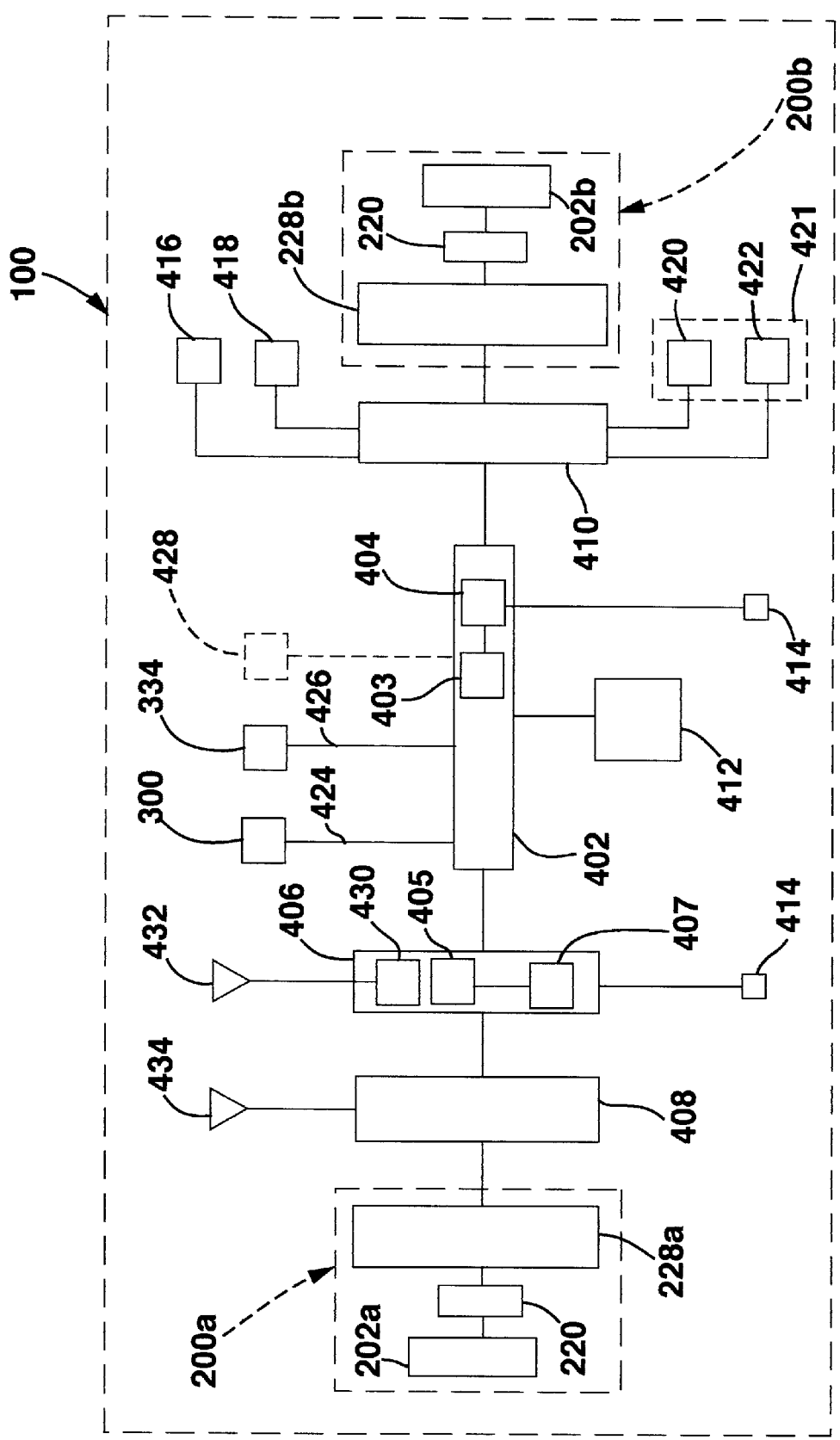
FIG. 8 is a block diagram showing electronic component subsystems of a robotic vehicle in accordance with one embodiment of the invention.

FIG. 8 is a block diagram illustrating electronic subsystems and components of the robotic vehicle 100 in accordance with one embodiment of the invention. The interconnections between the various PCBs and other components are shown for schematic purposes only. Those connections not pertinent to an understanding of the invention may be removed for clarity.

The main processor board 402, the radio processor board 406, the radio board 408, and the magnetometer board 410 are illustrated in their relative orientations. The PCB/power supply boards 228 are shown as a component of their respective drive assemblies 200, e.g., drive assembly 200a includes wheel 202a, battery cells 220, and PCB/power supply 228a.

The main processor board 402 includes the main processor 404 which executes software commands stored in a memory device 403 to, among other tasks, coordinate vehicle activities. The main processor board 402 preferably also includes a programming connector 414 to permit an external programming device, e.g., computer, to program instructions for storage in the memory device 403 and for execution by the main processor 404.

In the particular embodiments described herein, the main processor board 402 may be coupled to the retraction apparatus 300 via a circuit 424. By sending the appropriate signal to the retraction apparatus 300, power to the motor 302 to rotate the spool 310, e.g., extend (or retract) the spring member 104 (see FIG. 1), is provided. The main processor board 402 may be further able to sense when the retraction apparatus limit switch 334 (see FIG. 5) is activated, i.e., when the spring member 104 is in the first, stored position, via circuit 426.

The video camera assembly 412 and, optionally, other sensing devices 428 are also coupled to the main processor board 402 as shown. The video camera assembly 412 (see FIG. 7A) may include a miniature CMOS video camera 413 having a pinhole lens and an accompanying video board 415 to accommodate video electronics. An opening 105 is provided in the body 102 (see FIG. 2) so that the camera may capture images without visual interference from the body. While described herein with respect to a CMOS video camera, other devices, e.g., a CCD camera, may also be used without departing from the scope of the invention. However, the CMOS camera does offer advantages such as: the ability to integrate all or most all functionality into a single integrated circuit (IC); operate with relatively low power; and occupy a relatively small footprint.

The video camera assembly 412 may optionally be attached to the main processor board 402 via an adjustable base, e.g., an elevating, tilt/swivel base 440 as shown in FIG. 7B. The tilt/swivel base 440 permits a greater field of view without vehicle repositioning. In one embodiment, the tilt/swivel base 440 includes a first drive screw 442 extending generally perpendicular from the main processor board 402. Extending perpendicular from the first drive screw 442 is a second drive screw 444 to which the video camera assembly 412 is attached. The first drive screw 442 may selectively drive the camera assembly 412 vertically (as shown in FIG. 7B), e.g., outwardly from the body of the robotic vehicle 102. The second drive screw 444 may move the camera assembly laterally. A drive gear 446 may also be included at the base of the first drive screw 442 to rotate the latter. The drive gear 446 may be driven by the same motor that drives the first drive screw 442 or, alternatively, by a separate motor. The illustrated tilt/swivel base 440 is advantageous as it permits three degrees of movement for positioning the video camera 412 in most any orientation relative to the vehicle 100. Moreover, the illustrated embodiment of the base 440 is very compact, providing three degrees of movement with the use of two motors.

Coupled to a first end of the main processor board 420 is the radio processor board 406 with the radio processor 407 attached thereto. The radio processor 407, like the main processor 404, may be coupled to a memory device 405 and may include a programming connector 414 to permit coupling of an external programmer (not shown). While the main processor 404 may handle robotic vehicle control, e.g., movement, sensor data acquisition, video transmissions, etc., the radio processor 407 may be adapted to handle control commands, e.g., commands received from a remote computer such as the deployment and communication apparatus (described below) or another remote computer. For instance, the main processor 404 may capture video with the video camera assembly 412 and transmit the same to a remote computer via a video transmitter 430 coupled to a video antenna 432. In one embodiment, the video transmitter operates within the 900 MHz band, e.g., 918 MHz. However, most any radio frequency or for that matter, most any other wireless protocol, e.g., infrared, may also be acceptable. The video antenna 432 may attach to the body 102 of the vehicle 100 as shown in FIG. 1.

Coupled to the radio processor board 406 on a side opposite to the main processor board 402 is the radio board 408. The radio board 408 includes a data antenna 434 for communicating, e.g., receiving and transmitting information such as instructions and status respectively, with a remote computer. Like the antenna 432, the data antenna 434 may attach to the body 102 as shown in FIG. 1. In one embodiment, the radio board communicates with a remote computer via on-off keying (OOK) modulation operating at 434 MHz and/or 318 MHz. Reliability may be further enhanced by the use of an adaptive routing algorithm such as Architecture Technology Corporation's Source Adaptive Routing Algorithm (SARA). Adaptive routing permits each robotic vehicle 100 and deployment and communication apparatus (described in more detail below) to act as a router to increase end-to-end communication range. Once again, while described in terms of particular radio frequencies and transmission protocols, most any frequency or most any communication protocol is within the scope of the invention.

On the opposite side of the main processor board 402 is the magnetometer board 410, also shown in FIG. 8. The magnetometer board 402 may include one or more magnetometers which determine the magnetic heading of the vehicle 100. In one embodiment, the magnetometer board 402 includes two, perpendicular magnetometers 416 and 418. By providing two magnetometers, compass heading at any vehicle 100 orientation is possible. The magnetometer board 410 may also include one or more accelerometers. For example, the board 410 may include a two-axis accelerometer 421 comprising a horizontal or x-axis accelerometer 420 and a vertical or y-axis accelerometer 422. In addition to measuring accelerations affecting the vehicle 100, the accelerometers 420, 422 may also permit determination of vehicle tilt when stationary. For example, the accelerometers may measure rotational position about the longitudinal axis of the cylindrical body 102. Other embodiments may measure tilt angle from end-to-end (wheel-to-wheel) or tilt in most any other reference. Tilt determination may be advantageous for certain operations, e.g., when positioning the vehicle 100 for jumping.

The components and systems discussed above with respect to FIG. 8 are by no means exhaustive, i.e., other components or other configurations of the components described are certainly possible. For example, the components of the various PCBs may be combined with those of other PCBs, e.g., radio processor board 406 and the radio board 408 may be combined onto a single board. Accordingly, the actual interconnection architecture may include any configuration that operatively couples the electronic components.

Operation and Software

Having described the robotic vehicle 100 in accordance with the present invention, attention is now directed to its operation. When operating, digital commands may be received from the remote computer by the robotic vehicle's radio board via antenna 434 and routed to the radio processor 407 (See FIG. 8). In one embodiment, the commands may be encoded using Manchester encoding (or a suitable alternative) as is generally recognized in the art. The radio processor 407 decodes these commands and sends them to the main processor 404 via acceptable methods, e.g., a serial UART.

Once the instruction is received, the main processor 404 analyzes the instruction to determine what command has been sent. The command parameters may then be determined and the command executed by the main processor 404. When subsequent commands are received while the main processor is executing the previous command, the subsequent command may override the previous command if the two commands conflict, e.g., wheel rotate and wheel stop. Alternatively, the subsequent command may execute simultaneously or subsequent to the previous command. Examples of software commands are illustrate in FIGS. 9A–9C.

Figure 9A:
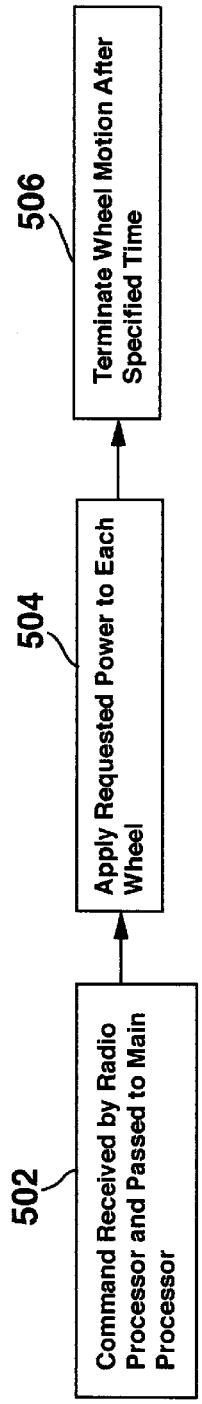
FIGS. 9A–9C are block diagrams illustrating exemplary software commands for operation of the robotic vehicle of FIG. 1, where

FIG. 9A illustrates the processing of a "wheel rotate" command for propelling the robotic vehicle 100 across a surface. Here, the command is received by the radio CPU 407 via the antenna 434 (see FIG. 8) and passed to the main processor 404 at 502 (see FIG. 9A). The wheel rotate command may specify speed and direction of each wheel and how long each wheel(s) is to rotate. The main processor may then apply power to the wheel(s) 202 at 504 and control the speed thereof through pulse-width modulation. That is, power to the drive assembly motors 204 (see FIG. 3) may be oscillated at different frequencies such that, the faster the frequency, the faster the wheel rotates.

An encoder (not shown) may be provided with each drive assembly 200 to measure wheel revolutions. If the encoder reveals that the wheel rotation is too slow for the requested speed, the main processor may increase the motor frequency. Likewise, if the encoder senses that wheel motion is too fast, the main processor 404 may decrease the motor frequency. The main processor 404 may also track how long the wheels 202 have been activated and turn them off after a specified time as represented at 506.

As a possible subset of the wheel rotate command, robotic vehicles 100 of the present invention may also execute a "flip" command (not illustrated). The flip command rotates the vehicle 100 about its longitudinal axis (e.g., wheel axis) so that the spring member 104 is repositioned. That is, the vehicle 100 may be flipped such that the spring member extends generally tangentially from the upper portion of the body 102 (not shown) rather than the lower portion of the body (as shown in FIG. 1). Such "flipping" of the robotic vehicle 100 may be advantageous, for example, to permit stabilization of the vehicle in different positions, e.g., on slopes, or alternatively, to reposition one of the on-board sensor devices, e.g., video camera assembly 412. Flipping may be accomplished in any number of ways. For example, in one embodiment, the vehicle is flipped merely by driving the wheels in reverse.

Figure 9B:
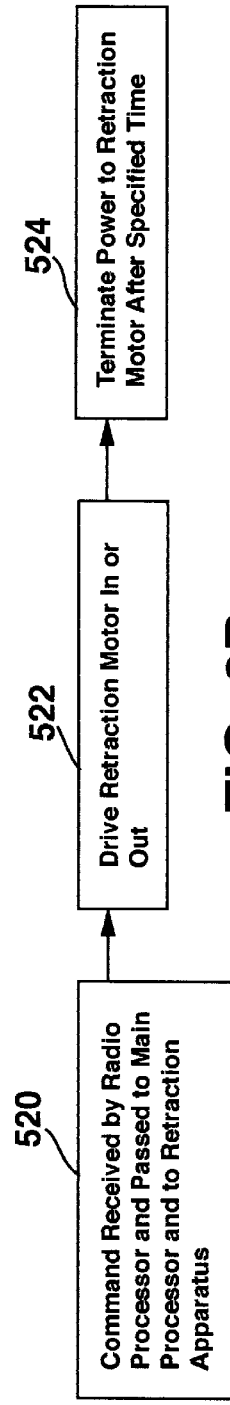

FIG. 9B illustrates an exemplary method of executing a "retract (or "extend") spring member" command to retract (or extend) the spring member 104 with the retraction apparatus 300. The command is received by the radio processor 407 and sent to the main processor 404 (see FIG. 8) as shown at 520. The "retract" command signal may specify the direction of spool 310 (see FIG. 5) and a duration of retraction. The main processor 404 then issues the command to the motor 302 as represented at 522. The retraction motor 302 may be driven in (or out) at a constant or a variable speed. Power to the motor 302 may be terminated as shown at 524. Power may terminate when the spring member 104 is fully retracted, i.e., when the limit switch 334 is tripped, or when the command times out.

Figure 9C:
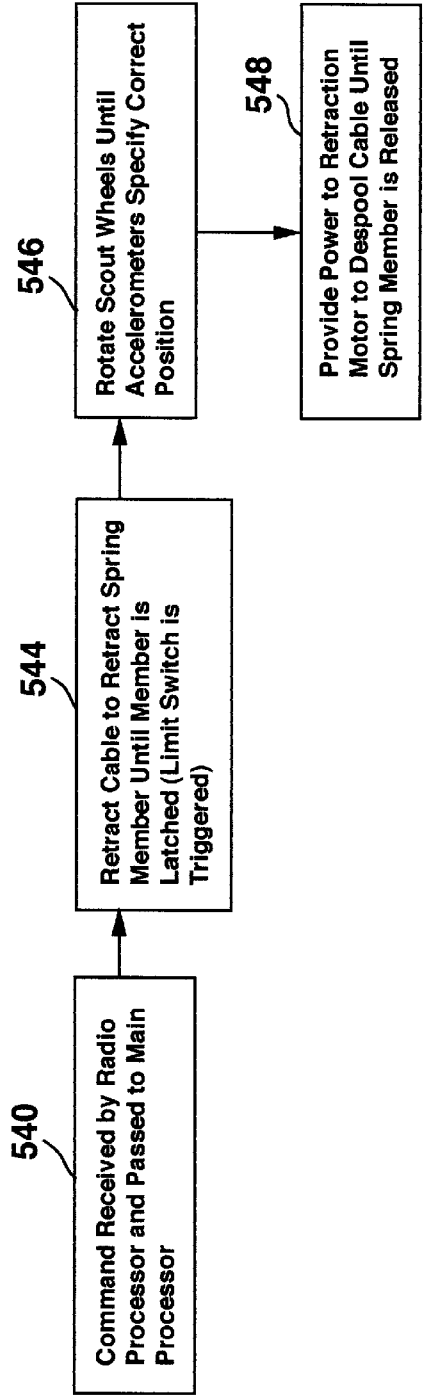

FIG. 9C illustrates an exemplary "vehicle jump" command. A "jump" command is received by the radio processor 407 and passed to the main processor 404 as shown at 540. The main processor then issues a "retract" command to retract and latch the spring member 104 in the first, stored position as described herein and as represented at 544. At this point, the vehicle 100 rotates its wheels 202 back and forth until the accelerometers 420 and 422 (see FIG. 8) indicate that the vehicle 100 is in a satisfactory jumping position, e.g., proximate the obstacle, acceptable body rotation or tilt, etc., as shown at 546. The cable 106 is then spooled out at 548. As the cable is despooled, the latching mechanism 320 (see FIG. 5) disengages from the spring member 104, permitting its release.

Other software commands may also be included. For example, "payload" and "halt" commands (neither of which is illustrated) are used in some embodiments. The payload command may merely specify parameters which describe what kind of payload should be activated and for how long. For instance, with the video camera assembly 412, the "payload" command may merely apply power to the camera and video transmitter system. If the optional pan/tilt unit 440 is included, each of the different motors that control elevation, rotation, and lateral movement may be specified by a different payload type parameter.

The "halt" command has no parameters and, when received by the main processor 404, it may terminate execution of all currently running commands. For example, upon receipt of the "halt" command, the payload may be deactivated, the wheels may be stopped, and the retraction apparatus 300 may be deactivated. This puts the vehicle 100 into a quiescent mode, where it may remain until it receives a new command to execute.

Figure 10A:
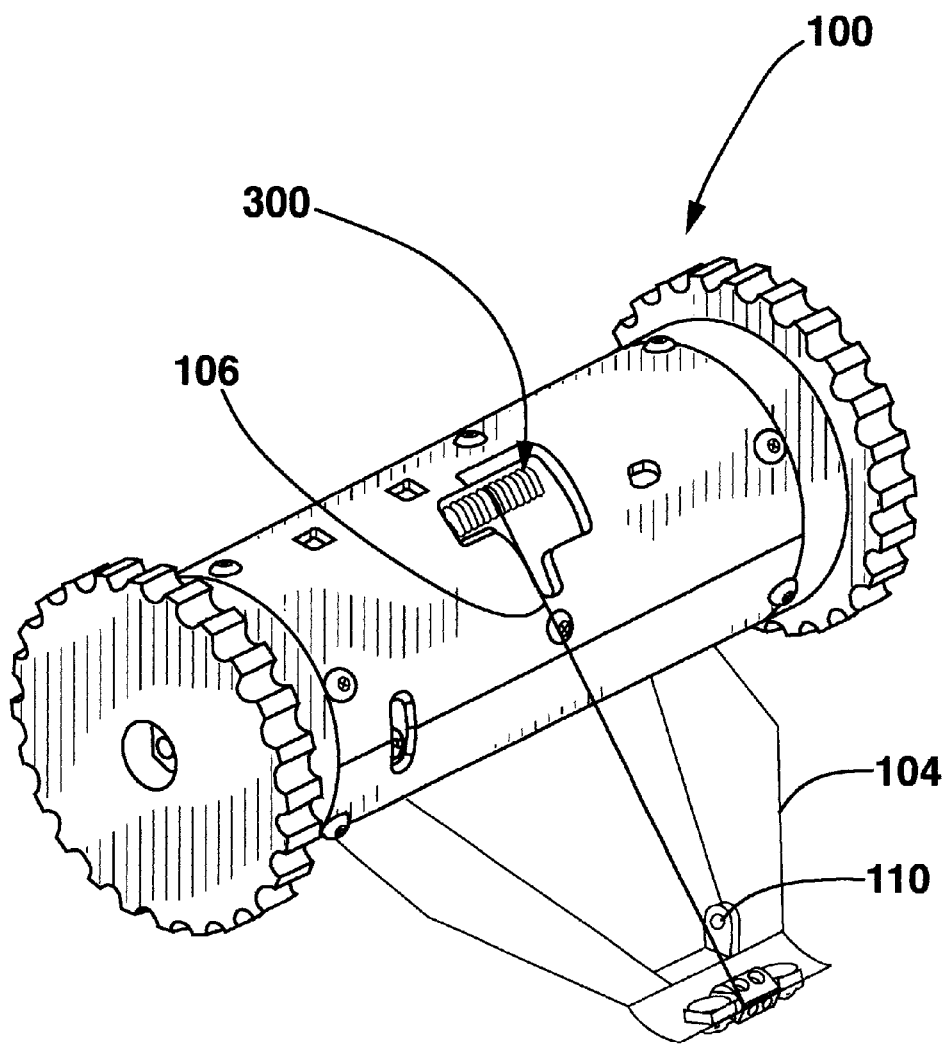
FIGS. 10A–10D illustrate operation of the spring member in accordance with one embodiment of the invention, where
Figure 10B:
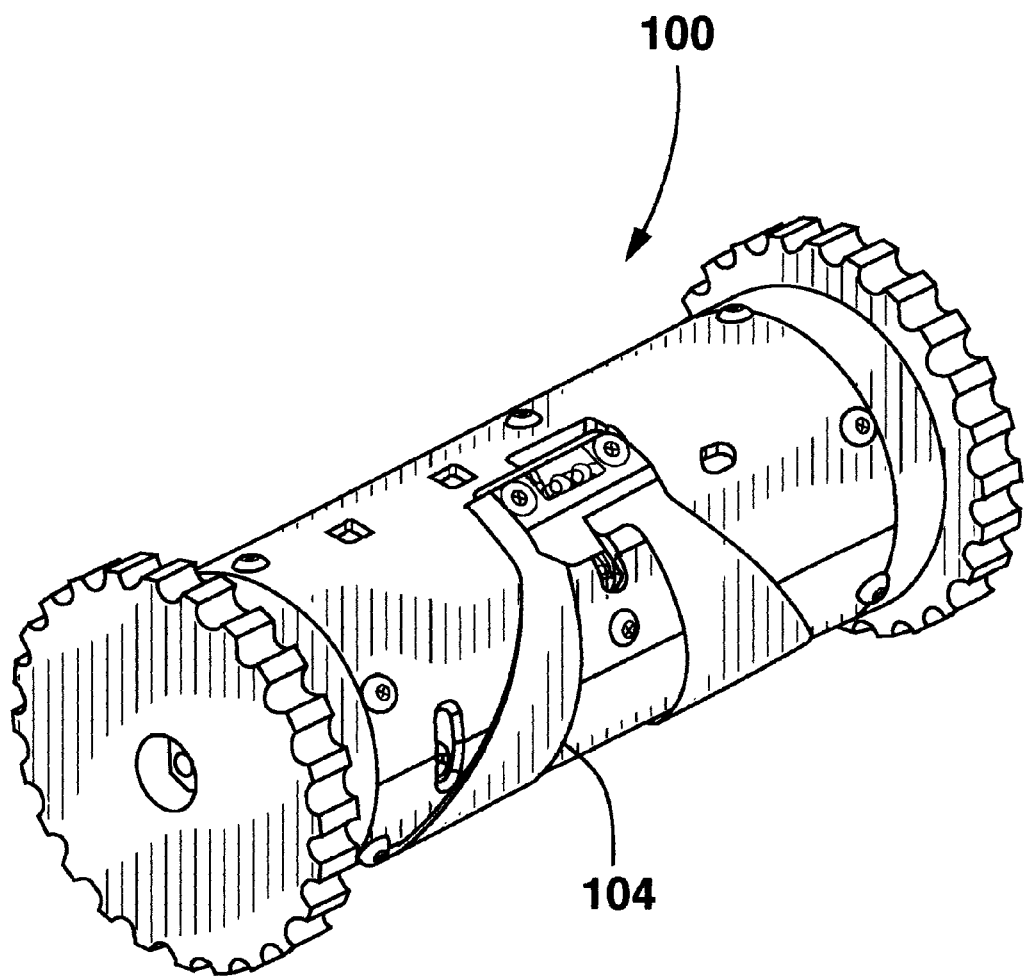
Figure 10C:
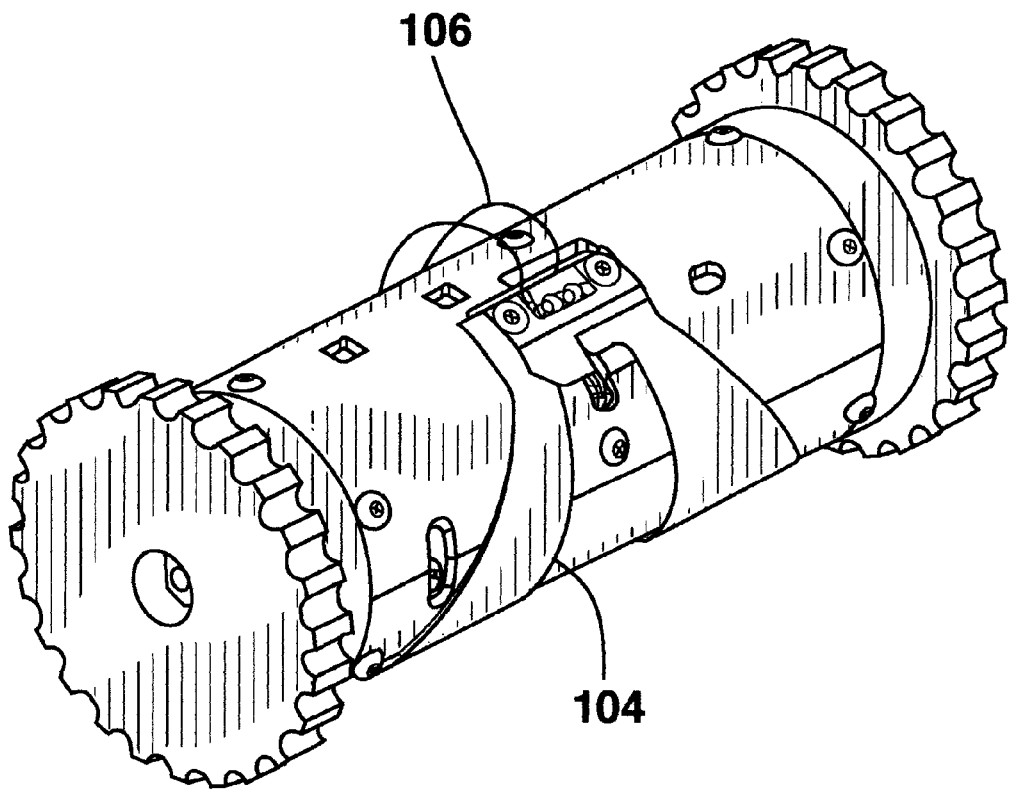
Figure 10D:
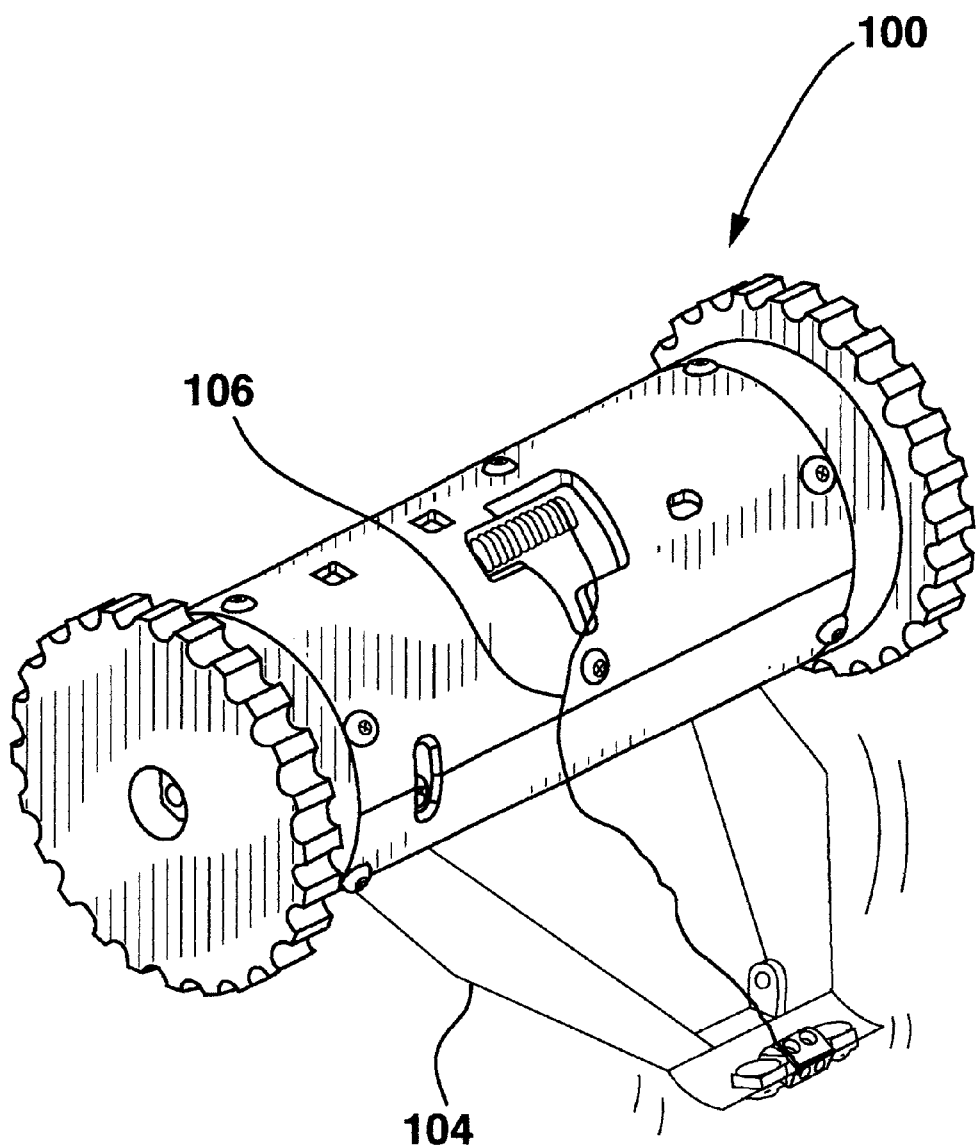

To further illustrate one exemplary method of jumping the vehicle 100, attention is directed to FIGS. 10A–10D. FIG. 10A shows the vehicle 100 prior to retraction of the spring member 104, i.e., the spring member 104 is shown in the second, extended position. By energizing the motor 302 of the retraction apparatus 300 (see FIG. 5), the cord 106 is retracted until the spring member 104 is in the first, stored position as shown in FIG. 10B. The latch mechanism 320 may then be automatically, or, alternatively, explicitly commanded to engage the latch member 110 as already described above. Once engaged, the spool 310 of the retraction apparatus 300 (see FIG. 5) may then reverse directions, releasing the cable 106 as shown in FIG. 10C. However, since the latch mechanism 320 is engaged, the spring member 104 remains in the first, stored position. Instead of spooling out of the body 102 as shown on FIG. 10C, the cable 106 may alternatively "expand" within the groove 309 of the spool 310 (see FIG. 5), e.g. become loose in the spool 310 as described above. Once the vehicle 100 is positioned proximate the obstacle, the latch mechanism 320 releases, permitting the spring foot 104 to move rapidly towards and beyond the second, extended position as shown in FIG. 10D. When the spring member 104 strikes the terrain, sufficient momentum transfer causes the vehicle 100 to leap or jump over the obstacle.

To further enhance the effectiveness of robotic vehicles of the present invention, software may be included which provides the vehicle with autonomous or semi-autonomous control capabilities. Because of the vehicle's small size, some of the software for such control may be external to the vehicle 100, e.g., located at a remote computer such as the deployment and communication apparatus (described below). That is, a remote computer may automatically control the robotic vehicle 100 in response to information provided by the vehicle 100. In other embodiments, the software for controlling autonomous behavior may be provided on-board. In either event, such autonomy is advantageous in that minimal operator interaction is required to execute command sequences.

Figure 11:
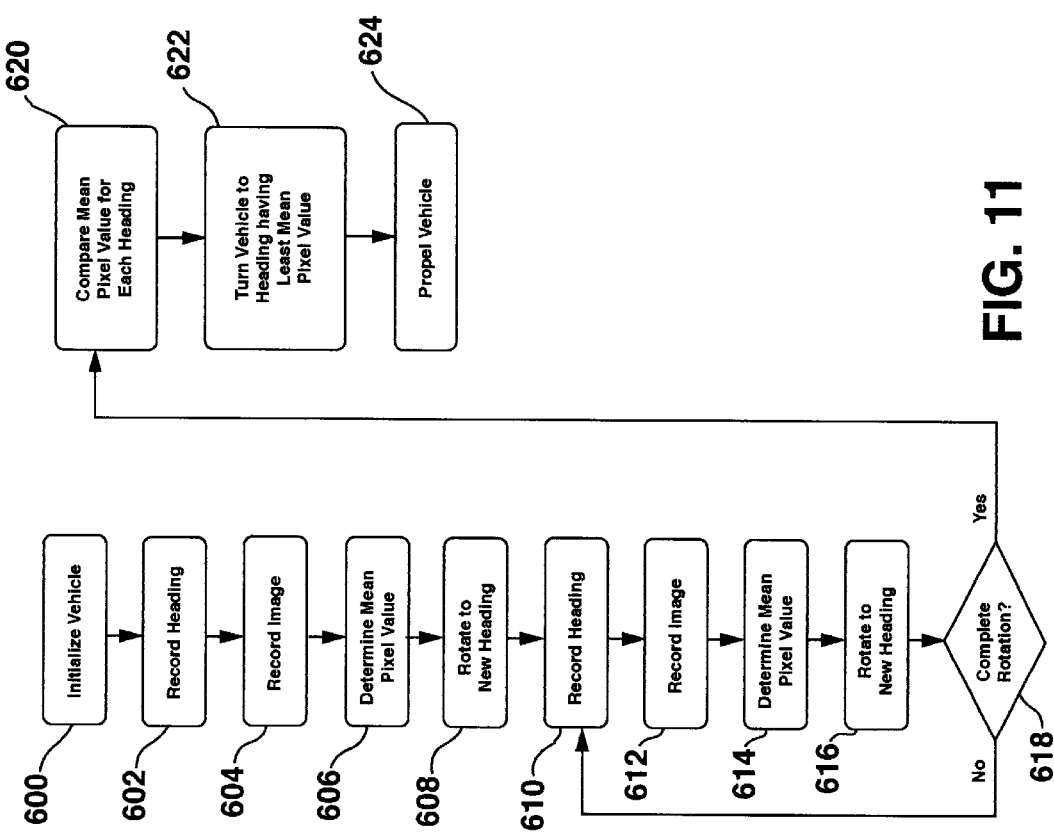
FIG. 11 is a flow chart illustrating autonomous positioning of the robotic vehicle in accordance with one embodiment of the invention.

In the surveillance and reconnaissance scenarios, an objective is to position the robotic vehicle in a location where it is least likely to be detected. For example, upon entering a room, it may be advantageous to position the vehicle 100 in the darkest portion of that room to decrease the chances of detection. Accordingly, an exemplary technique for automatically positioning the vehicle in the darkest portion of a room is provided and generally illustrated in FIG. 11.

Once the robotic vehicle 100 is delivered or otherwise transported to the surveillance location, e.g., room, the vehicle 100 may, if necessary, complete an initialization mode as represented by 600. Initialization prepares the vehicle systems for determining the darkest area of the room. Once initialized, the vehicle 100 records its magnetic heading at 602 using the magnetometers 416 and 418 described above. Using the video camera assembly 412, the vehicle 100 then records an image at the heading as shown at 604. The image and heading information are then sent to the remote computer. By analyzing the pixels in the recorded image, a mean pixel value representing the ambient light of the image is determined as shown at 606.

Once the mean pixel value is determined the vehicle 100 is automatically commanded to turn to a new heading as shown at 608. Alternatively, the vehicle 100 may be commanded to a new heading by rotating one or both wheels for a specified time. Still further, encoders optionally provided with the wheels may provide feedback regarding how much each wheel has rotated. This wheel rotation may then be correlated to vehicle rotation. Regardless of the method used to rotate the vehicle 100, the new heading is recorded by the remote computer at 610 and an image corresponding to the new heading is capture as shown at 612. While various algorithms maybe used, the new heading may be selected based on the field of view of the video camera assembly 412. That is, the new heading is preferably selected to account for an acceptable overlap of the first image captured and the second image captured. In one embodiment, the vehicle 100 is rotated by rotating one of the wheels 202 (see FIG. 1) or, alternatively, by rotating the wheel 202a in one direction while rotating wheel 202b in the opposite direction. In either embodiment, the algorithm controlling vehicle rotation preferably spins the wheel(s) to rotate the vehicle 100 by a discrete increment.

Once the second image is captured and transmitted to the remote computer, the mean pixel value for the second image is determined by the remote computer as shown at 614. The vehicle 100 is then commanded to rotate by the discrete increment to a new heading as shown at 616. The remote computer compares the new heading to the original or first heading at 618 to determine whether or not the vehicle has made a complete revolution. If not, the algorithm returns to 610 and repeats the steps for the new heading. If the vehicle has executed a complete revolution, the remote computer then compares the mean pixel value for each heading recorded at 620. The heading having the least mean pixel value, e.g., lowest detected light, is then determined and the vehicle is commanded to turn to that heading as shown at 622. Finally, the vehicle 100 is commanded in the direction of the heading having the least mean pixel value as shown at 624. The vehicle stops when it contacts an object, e.g., wall. In one embodiment, the vehicle 100 may sense that it has contacted an object and is no longer moving when the remote computer detects that the mean pixel value no longer changes with respect to time. While described herein as a method for finding the darkest portion of a room, the techniques described could also be used to move the vehicle 100 towards the lightest area. Accordingly, robotic vehicles 100 of the present invention may utilize "frame differencing" (i.e., comparison of images captured by the on-board video camera assembly 412) to provide some level of autonomous control.

Once positioned, the robotic vehicle 100 may utilize, in conjunction with the remote computer, similar frame differencing techniques to detect motion. Alternatively, the remote operator may manually monitor the video signal provided by the vehicle to detect motion. When the video camera assembly 412 is attached to the vehicle 100 via the tilt/swivel base 440 described above, MEMS control may allow responsive positioning of the assembly 412 to permit following the object detected. While wheel motion may also be used to reposition the vehicle in response to object motion, MEMS control may offer more dynamic, efficient, and quieter operation.

Deployment and Communication Apparatus

Figure 12A:
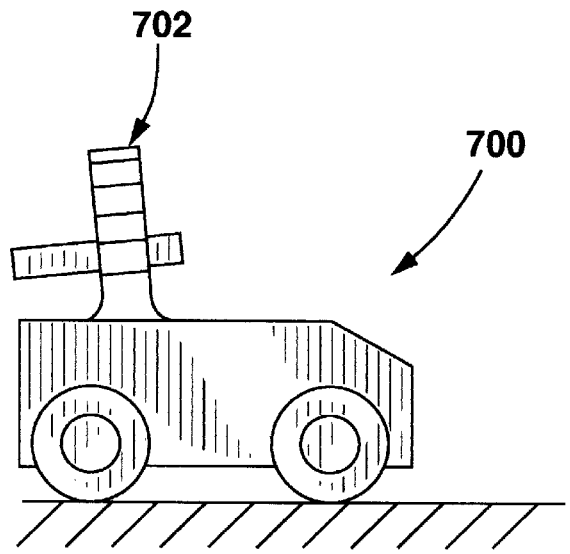
FIG. 12A is a diagrammatic illustration of a deployment and communication apparatus in accordance with one embodiment of the invention.

FIG. 12A illustrates a deployment and communication apparatus 700 in accordance with one embodiment of the invention. The apparatus 700 is designed to transport and deliver one or more individual robotic vehicles 100 to a desired area. These apparatus may also include electronics and adequate computing capacity to permit coordination of vehicle 100 behaviors as well as processing and organization of data collected from the vehicles 100 for presentation to remote personnel.

The apparatus 700 may be a larger robotic vehicle adapted to carry and deliver one or more robotic vehicles 100 to a surveillance site. For instance, the deployment apparatus may be based on a model ATRV-Jr. produced by Real World Interface, a division of iRobot Corporation. The apparatus 700 may carry and deliver vehicles 100 in indoor or outdoor terrain over distances up to about 12 miles (20 km). In embodiments where multiple apparatus 700 are utilized, radio communications between apparatus 700 may be within the 2.4 GHz spectrum. As those of skill in the art will realize, other frequencies or other communication protocols may also be used.

The apparatus 700 may further include a delivery mechanism, e.g., "launcher" 702, shown diagrammatically in FIGS. 13A–13D. The launcher 702 is able to deliver, e.g., launch, the robotic vehicles 100 to their desired destination. While the particular configuration of the launcher may vary, an exemplary embodiment is diagrammatically illustrated in FIGS. 13A–13D.

Figure 13A:
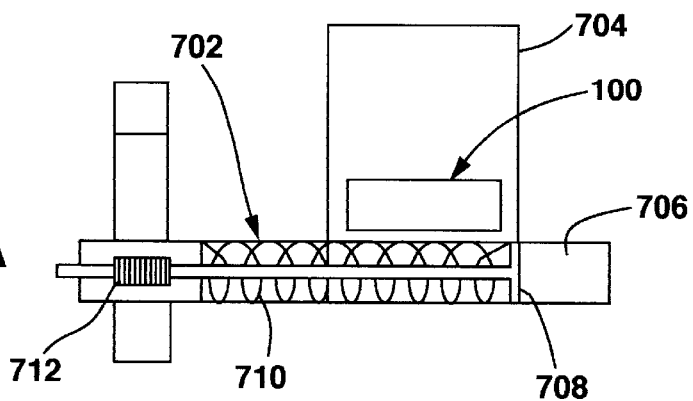
FIGS. 13A–13D illustrate a method for launching a robotic vehicle from the deployment apparatus of FIG. 12A.

FIG. 13A illustrates one or more vehicles 100 located within a storage magazine 704 mounted to the apparatus 700. An exemplary storage magazine 704 may hold up to ten vehicles 100 in a carousel-type device. However, magazines adapted to store most any number of vehicles 100 are possible. The storage unit is coupled to a barrel 706 having a piston 708 and a spring 710 therein. A cocking mechanism 712 is provided to cock the piston 708, e.g., retract the piston 708 against the force of the spring. In one embodiment, the cocking mechanism includes a stepper motor which drives a cocking gear selectably engagable with a threaded portion on the shaft of the piston 708. The cocking gear may be coupled to the stepper motor by a separate apparatus, e.g., DC motor (not shown), which permits the cocking gear to be engaged and disengaged from the threaded portion of the shaft of the piston 708 as desired.

During operation, the delivery mechanism 702 may be configured in idle mode as generally represented by FIG. 13A. In idle mode, the spring 710 is extended, e.g., relaxed, and the piston 708 is extended into the storage magazine 704. In this configuration, the storage magazine 702 is prohibited from rotation by the engagement of the piston 708.

Figure 13B:
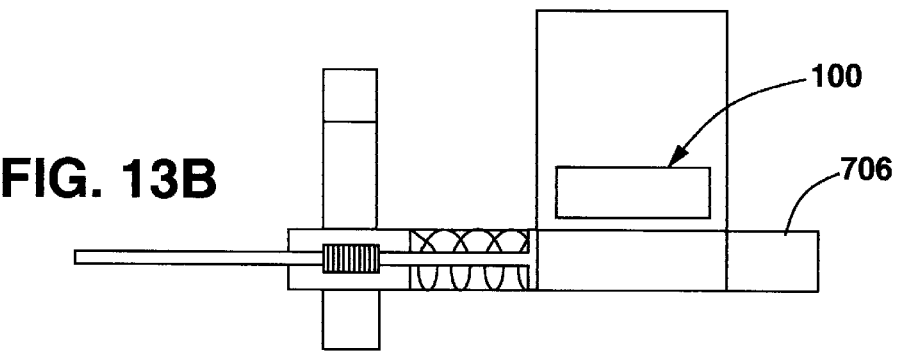
Figure 13C:
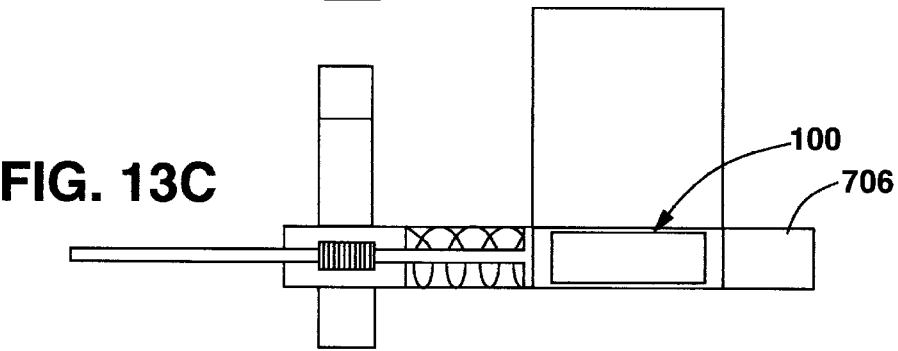
Figure 13D:
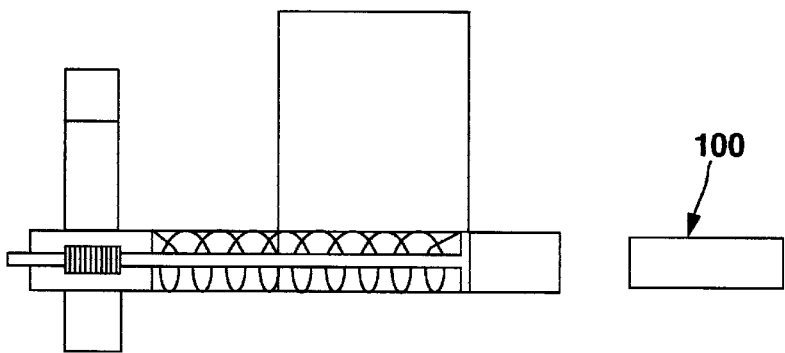

When the deployment apparatus 700 is prepared to deliver a robotic vehicle 100, the cocking gear of the stepper motor may be selected to engage the threaded portion of the piston 708 and the stepper motor activated, thereby retracting the piston against the spring 710. Once the plunger is removed from the magazine 704 as shown in FIG. 13B, the stepper motor stops. The magazine 704 may then be rotated to provide a vehicle 100 to the barrel 706 as shown in FIG. 13C. At this point, the cocking gear of the stepper motor may be disengaged from the threaded portion of piston 708, allowing the piston to move rapidly under the biasing force of the spring. As the piston moves, the vehicle is launched from the barrel 706 with sufficient velocity to place the vehicle 100 in the desired location as shown in FIG. 13D.

By accommodating multiple vehicles 100, the apparatus 700 can effectively blanket a surveillance site with robotic vehicles 100. For instance, the apparatus can travel through a corridor and launch a vehicle 100 into each room connected thereto. Door detection algorithms and sensors located on the apparatus 700 may assist with such delivery. Alternatively, a remote operator may manually control the apparatus 700 during delivery the vehicles 100.

To accommodate varying delivery scenarios, the compression of the spring 710 may be adjusted, e.g., the stepper motor may reposition the piston to a position resulting in less spring compression, prior to launch. In other embodiments, the angle of the barrel 706 relative to the ground may be pre-selected or, alternatively, dynamically adjustable, to provide the desired trajectory.

Figure 12B:
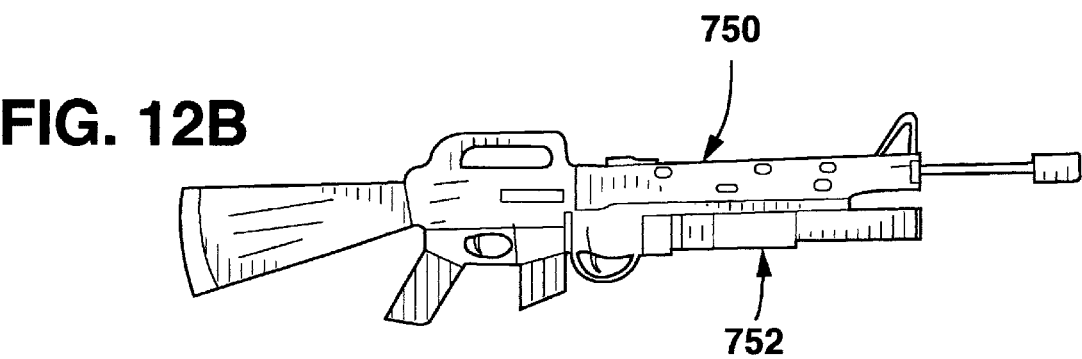
FIG. 12B is a diagrammatic illustration of a deployment and communication apparatus in accordance with another embodiment of the invention.

While the deployment apparatus 700 is described with particularity in FIGS. 12A and 13A–13D, other embodiments are also possible. For instance, a launcher, e.g., a launcher 752 attached to a handheld device, e.g., rifle 750, as shown in FIG. 12B may also be used.

Where the robotic vehicle 100 has a deliverable shape that is not round, a delivery apparatus having a barrel shaped to conform to the vehicle may be provided. Other delivery apparatus and methods are also possible, e.g., tossing or throwing by hand.

Protective Casing

Figure 14A:
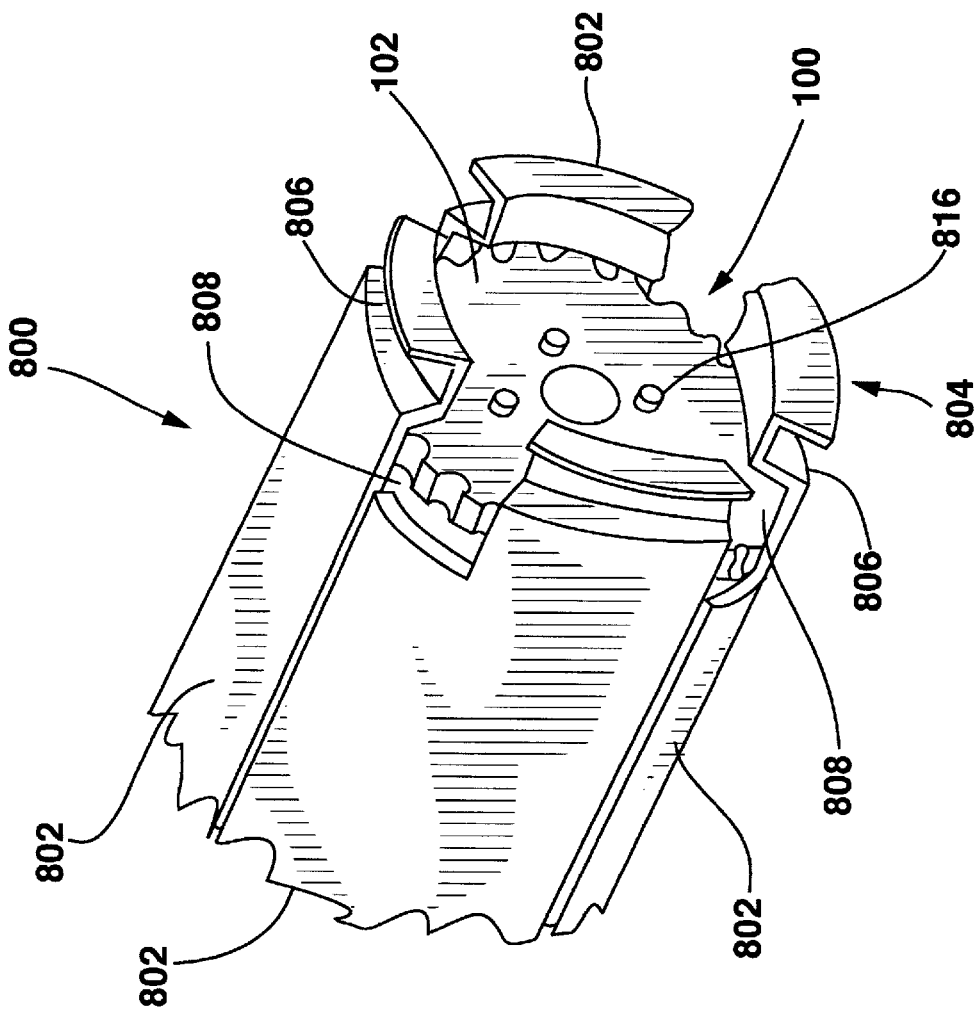
Figure 14B:
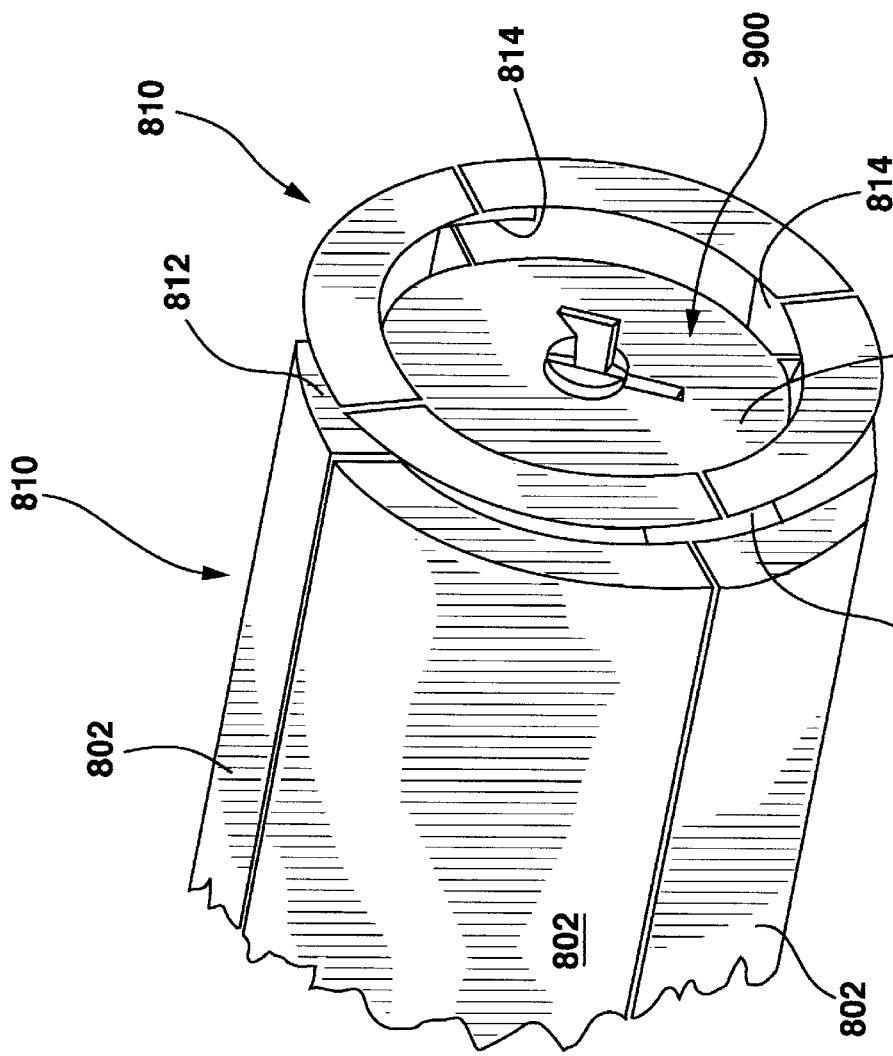

Because the vehicles 100 are designed to be launched over relatively large distances, e.g., up to about 100 ft (30 m), the vehicle 100 may be provided with a protective casing 800, an exemplary embodiment of which is shown in FIGS. 14A and 14B. Here, the casing 800 include four semi-cylindrical segments 802 that envelope the vehicle 100. At a first tension end 804 (see FIG. 14A), the segments 802 extend beyond the length of the vehicle 100. A groove 806 is formed in each segment. The segments 802 further include a cutout portion 808, the purpose of which will become apparent below.

FIG. 14B illustrates the opposing, second release end 810. Like the first tension end, the release end 810 may also include a groove 812. However, unlike the first tension end, the release end, in one embodiment, may not include cutout portions 808 (see FIG. 14A). Instead, the second release end may include windows 814 which permit access through the inner diameter of the groove 812.

The material used to make the casing segments 802 may be selected to provide adequate shock absorption to the vehicle 100 during transport and delivery. For instance, the material may be polyvinyl chloride (PVC). In other embodiments, the segments may be constructed of a material, e.g., plastic, aluminum, that deforms to absorb impact energy. Optionally, an additional deformable layer, e.g., foam rubber, may be included and attached to the casing segments 802, e.g., along the inside surfaces, to further protect the vehicle 100 from shock loading upon impact. Still other embodiments may utilize yet other casing materials and structures.

To assist with removal of the casing 800 after deployment, a casing release mechanism 900, shown at the release end 810 in FIG. 14B, may also be provided. The mechanism 900, as illustrated in FIGS. 15A–15D, includes a spacer 902 and a stop 904. The stop includes features, e.g., holes 906, which permit it to couple to wheel 202. In one embodiment, features such as protrusions 816 (shown on tension end 804 in FIG. 14A) on the wheels 202 engage the holes 906. In other embodiments, the stop 904 may include protrusions or pins that press into the soft wheel material to hold the stop 904 in place. The stop 904 further includes a half-moon-shaped raised portion 908 best viewed in FIGS. 15A and 15C.

The spacer 902 may include tabs 903 to correctly position the spacer relative to the casing 800 (see FIGS. 14A and 14B) and a band release hook 910 may be. provided and pivotally attached to the spacer 902 at pivot 912 as shown in FIG. 15B. The hook 910 has a leg which extends towards the stop 904.

In use, the casing 800 is assembled over the vehicle 100. A binder, e.g., endless rubber band (not shown), is then placed around the casing 800 within the groove 806 (see FIG. 14A) to tightly hold the segments 802 in place at the first tension end 804. At the opposing end, the stop 904 is coupled to the wheel 202 and the spacer is engaged such that the hook 910 engages the raised portion 908 as shown in FIG. 15B. A second binder is then looped around the hook 910 such that tension is applied to the hook in the direction 914 (see FIG. 15B). The second binder then extends outside one of the windows 814 (see FIG. 14B) and wraps completely around the segments 802 within the groove 812. The binder then enters the same window 814 and wraps around the hook 910 once again. The binders thus hold the casing in place during deployment.

Once deployed, the vehicle 100 is given a command to rotate at least the wheel on the second release end 810. As the wheel rotates, it causes the stop 904 (see FIG. 15B) to rotate as well. As the stop rotates, the raised portion 908 eventually rotates 90° (see FIG. 15D), permitting the hook 910 to pivot in the direction 916 under the biasing force 914 (see FIG. 15B) of the second binder. As the hook pivots towards the position illustrated in FIG. 15D, the second binder is released from the second release end 810. The stop 904 may also fall away from the wheel or, alternatively, it may remain attached thereto.

The first binder at the tension end 804 then causes the end of the segments 802 to draw towards one another. By adequately sizing the cutout portions 808 (see FIG. 14A) and selecting the binder to provide adequate tension, the segments 802 splay apart at the now unrestrained tension end 810. As a result, the segments eventually separate sufficiently to permit the vehicle 100 to exit the casing 800.

The protective casing 800 thus allows safe deployment of the vehicle 100 while permitting quick separation from the vehicle thereafter. Although described with particularity, the casing embodiments described herein are intended to be exemplary only. Other casing configurations are certainly possible without departing from the scope of the invention. For example, the binder (or a like device) may be released upon contact of the casing with an object, e.g., the ground. Furthermore, the vehicle 100 itself may be designed for safe deployment without the use of a protective casing.

Example Systems

FIG. 16 illustrates an exemplary distributed robotic system having multiple vehicles 100 and multiple deployment and communication apparatus 700. The vehicles 100 communicate primarily with a mobile control and communication server 1002 which, in one embodiment, is located on the deployment and communication apparatus 700. The communication server 1002 coordinates the behaviors of the multiple vehicles and may collect and present data to another remote computer 1004 located at a remote workstation 1000. The remote workstation 1000 may be a fixed system or, more preferably, a mobile communications vehicle which can be located within an acceptable range of the mobile communication server 1002 and/or the individual vehicles 100. While described herein with respect to a one or more communication servers 1002, other embodiments utilize no mobile communication servers 1002. That is, the vehicles 100 communicate directly with the remote computer 1004.

Figure 17:
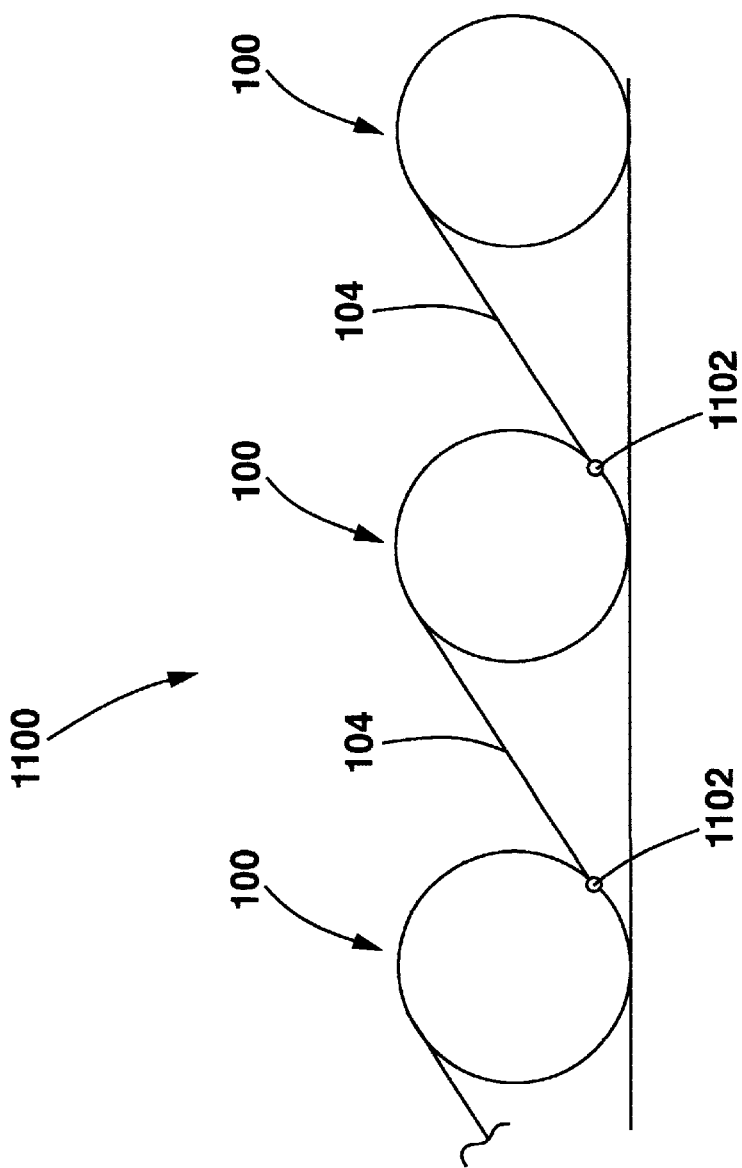
FIG. 17 is a diagrammatic view of several robotic vehicles coupled to form a single linked vehicle in accordance with one embodiment of the invention.

In other embodiments, numerous robotic vehicles 100 may be joined together to produce a single, linked vehicle 1100 as shown in FIG. 17. While the vehicles 100 may be linked in most any fashion, the embodiment illustrated in FIG. 17 couples the units via their respective spring members 104. For instance, the vehicles 100 may be inverted, e.g., "flipped" as described above, such that each spring member 104 extends tangentially from generally the upper portion of the respective body 102. The distal end of the spring member 104 may then be coupled to a lower portion of an adjacent vehicle 100, preferably via a hinged joint 1102. By joining two or more vehicles in this manner, an articulating linked vehicle 1100 is produced that may provide benefits for certain applications. For example, rotating the wheels and/or retracting the spring member of one vehicle 100 may permit relative movement between the linked vehicles 100, e.g., one vehicle may be elevated above one or more adjacent vehicles. Such movement may be beneficial in traversing some obstacles. Further, this type of movement may allow the linked vehicle 1100 to move in an inch-worm-like manner.

These embodiments, along with the others described herein, are provided as only exemplary uses of the present invention and are in no way intended to limit the scope of the invention, i.e., other embodiments are certainly possible without departing from the scope of the invention.

CONCLUSION

Advantageously, vehicles 100 of the present invention may be used as either solitary robots or as part of a multi-unit team. They may operate under autonomous control (remote or local), semi-autonomous control, manual control, or any combination thereof. Vehicles 100 may further include traction members that permit traveling over most any terrain, and one or more spring members coupled to the vehicle that permit jumping over or onto obstacles. Accordingly, vehicles of the present invention are well-suited for maneuvering through unfamiliar territory and positioning themselves for covert monitoring. By including sensing devices on-board, the vehicles, systems, and methods of the present invention have utility across a wide spectrum of robotic applications including, for example, surveillance and reconnaissance missions.

The complete disclosure of the patents, patent documents, and publications cited in the Background, Detailed Description and elsewhere herein are incorporated by reference in their entirety as if each were individually incorporated.

Exemplary embodiments of the present invention are described above. Those skilled in the art will recognize that many embodiments are possible within the scope of the invention. For instance, the robotic vehicles may be tethered, e.g., utilize physical communication links rather than wireless where the application permits. Other variations, modifications, and combinations of the various parts and assemblies can certainly be made and still fall within the scope of the invention. Thus, the invention is limited only by the following claims, and equivalents thereto.

What is claimed is:

1. A method for traversing one or more surfaces with a ground-engaging, robotic vehicle, the method comprising:
   providing a ground-engaging, robotic vehicle, comprising:
   a body,
   at least a first and a second ground-engaging member operatively coupled to the body, and
   a spring member coupled to the body, the spring member movable between at least a first, stored position and a second, extended position; and
   a retraction apparatus operable to move the spring member to at least the first, stored position; and
   energizing one or both of the first and second ground-engaging members so that the ground-engaging robotic vehicle is propelled across a surface.

2. The method of claim 1, wherein the method further comprises retracting the spring member to the first, stored position, and releasing the spring member from the first, stored position.

3. The method of claim 1, wherein the method comprises releasing the spring member from the first, stored position and striking the surface, with the spring member, with sufficient force to lift the robotic vehicle from the surface.

4. The method of claim 1, wherein the method further comprises moving the spring member between the second, extended position and the first, stored position.

5. A ground-engaging robotic vehicle, comprising:
   a body;
   two or more rotatable, ground-engaging wheels coupled to the body, the ground-engaging wheels operable to propel the robotic vehicle across a surface;
   a spring member coupled to the body, the spring member movable between at least a first, deflected position and a second, undetected position; and
   a retraction apparatus operable to position the spring member in the first, deflected position, the second, undeflected position, or anywhere in between.

6. The ground-engaging robotic vehicle of claim 5, wherein the retraction apparatus comprises:
   a spool;
   a power source coupled to the spool, the power source operable to selectively rotate the spool in either a first direction or a second direction; and
   a flexible cable having a first end coupled to the spool and a second end coupled to the spring member.

7. The ground-engaging robotic vehicle of claim 5, wherein the retraction apparatus further comprises a latch mechanism operable to secure the spring member when the latter is in the first, deflected position.

8. The ground-engaging robotic vehicle of claim 6, wherein rotating the spool in the first direction retracts the flexible cable, moving the spring member towards the first, deflected position and rotating the spool in the second direction extends the flexible cable, moving the spring member towards the second, undeflected position.

9. The ground-engaging robotic vehicle of claim 5, further comprising one or more sensing devices associated with the body.

10. The ground-engaging robotic vehicle of claim 9, wherein the one or more sensing devices comprises a video camera assembly.

11. The ground-engaging robotic vehicle of claim 10, wherein the video camera assembly is coupled to the vehicle with an adjustable base.

12. The ground-engaging robotic vehicle of claim 10, wherein the video camera assembly is at least partially enclosed within the body.

13. The ground-engaging robotic vehicle of claim 9, wherein the one or more sensing devices comprises a microphone.

14. The ground-engaging robotic vehicle of claim 9, wherein the one or more sensing devices comprises a magnetometer.

15. The ground-engaging robotic vehicle of claim 9, wherein the one or more sensing devices comprises a tilt sensor.

16. The ground-engaging robotic vehicle of claim 15, wherein the tilt sensor comprises at least one accelerometer.

17. The ground-engaging robotic vehicle of claim 16, wherein the at least one accelerometer is a two-axis accelerometer.

18. The ground-engaging robotic vehicle of claim 5, further comprising one or more antennas coupled to the body.

19. The ground-engaging robotic vehicle of claim 18, wherein the one or more antennas comprises an antenna for transmitting status data to and receiving commands from a remote location.

20. The ground-engaging robotic vehicle of claim 5, wherein the spring member may be located in the second, undeflected position or in a position between the first, deflected position and the second, undeflected position, such that the spring member engages the surface.

21. The ground-engaging robotic vehicle of claim 5, further comprising a drive wheel motor coupled to each ground-engaging wheel.

22. The ground-engaging robotic vehicle of claim 5, further comprising a protective casing covering a portion of the vehicle, the casing operable to protect the robotic vehicle during transport and delivery.

23. The ground-engaging robotic vehicle of claim 22, further comprising a casing release mechanism operable to release the protective casing from the robotic vehicle.

24. The ground-engaging robotic vehicle of claim 22, wherein the casing is releasable by movement of one or both of the ground-engaging wheels.

25. The ground engaging robotic vehicle of claim 6, wherein the spool is cylindrical and comprises a recessed, continuous helical groove.

26. A method of traversing an obstacle with a ground-engaging robotic vehicle, the method comprising:
   providing a ground-engaging, robotic vehicle, comprising:
      a body;
      at least a first and a second ground-engaging wheel operatively coupled to the body; and
      a spring member coupled to the body, the spring member movable between at least a first, deflected position and a second, undeflected position; and
   locating the ground-engaging robotic vehicle upon a surface proximate an obstacle; and
   positioning the spring member in the first, deflected position;
   releasing the spring member from the first, deflected position, whereby the spring member strikes the surface with sufficient force to propel the ground-engaging vehicle over or onto the obstacle.

27. The method of claim 26, wherein positioning the spring member in the first, deflected position comprises:
   providing a retraction apparatus comprising:
      a retraction mechanism coupled to the body, the retraction mechanism having a spool rotatably coupled to the body, the spool rotatable in at least a first direction;
      a cable extending between the spool and the spring member; and
      a latching mechanism operable to releasably latch the spring member in the first, deflected position; and
   rotating the spool in the first direction, thereby moving the spring member to the first, deflected position.

28. The apparatus of claim 27, further comprising:
   latching the spring member in the first, deflected position with the latching mechanism;
   rotating the spool in a second direction opposite the first direction, thereby unwinding the cable from the spool; and
   releasing the latching mechanism such that the spring member is released from the first, undeflected position.

29. The method of claim 26, further comprising positioning the ground-engaging robotic vehicle proximate the obstacle prior to releasing the spring member.

30. A method of delivering one or more ground-engaging robotic vehicles to a desired location, the method comprising:
   providing at least one ground-engaging, robotic vehicle, comprising:
      a body;
      at least a first and a second ground-engaging wheel operatively coupled to the body; and
      a spring member coupled to the body, the spring member movable between at least a first, deflected position and a second, undeflected position;
   providing a delivery apparatus operable to hold the at least one ground-engaging robotic vehicle; and
   delivering the at least one ground-engaging robotic vehicle to the desired location with the delivery apparatus.

31. The method of claim 30, wherein delivering the at least one ground-engaging robotic vehicle comprises guiding the delivery apparatus to, or proximate to, the desired location and ejecting the at least one ground-engaging robotic vehicle from the delivery apparatus.

32. The method of claim 30, further comprising establishing a wireless communication link between the at least one ground-engaging robotic vehicle and a remote workstation.

33. The method of claim 32, wherein establishing the wireless communication link comprises communicating between the remote workstation and the delivery apparatus and between the delivery apparatus and the at least one ground-engaging robotic vehicle.

34. A robotic system, comprising:
   at least one ground-engaging, robotic vehicle, comprising:
      a body,
      at least a first and a second ground-engaging wheel operatively coupled to the body, and
      a spring member coupled to the body, the spring member movable between at least a first, deflected position and a second, undeflected position; and
   a remote workstation adapted to wirelessly communicate with the at least one ground-engaging robotic vehicle.

35. The robotic system of claim 34, further comprising a delivery apparatus for delivering at least one ground-engaging robotic vehicle to a desired location.

36. The robotic system of claim 35, wherein the delivery apparatus is a robotic delivery vehicle operable from the remote operator station.

37. The robotic system of claim 34, wherein the remote workstation comprises a palm-sized portable computer.

38. A method for guiding a ground-engaging robotic vehicle to the darkest portion of a predetermined area, the method comprising:
   providing a ground-engaging, robotic vehicle, comprising:
      a body,
      two or more ground-engaging wheels operatively coupled to the body, and
      camera coupled to the body;

capturing a first image with the camera;

rotating the camera by a discrete increment;

capturing a second image with the camera;

comparing one or more characteristics of the first image and the second image; and moving the robotic vehicle in a direction based on the comparing of one or more characteristics.

39. The method for of claim 38, wherein the one or more characteristics comprises light intensity.

40. The method for of claim 39, further comprising selecting the direction by determining which of the first and second images have the least light intensity.

41. The method for of claim 39, further comprising comparing light intensity values for a plurality of images taken at a corresponding plurality of camera positions.

42. The method of claim 38, wherein rotating the camera comprises rotating one or both of the ground-engaging wheels.

43. A ground-engaging robotic vehicle, comprising:

a cylindrically shaped body;

two or more ground-engaging members coupled to the body, the ground-engaging members operable to propel the robotic vehicle across a surface; and a spring member coupled to the body, the spring member movable, between at least a first, stored position and a second, extended position.

44. The robotic vehicle of claim 43, further comprising a retraction apparatus operable to move the spring member to at least the first, stored position.

45. The robotic vehicle of claim 43, further comprising control circuits operable to permit remote control of the vehicle.

46. A ground-engaging robotic vehicle, comprising:

a body;

two or more ground-engaging members coupled to the body, the ground-engaging members operable to propel the robotic vehicle across a surface;

a spring member coupled to the body, the spring member movable between at least a first, stored position and a second, extended position; and control circuits associated with the body, the control circuits operable to permit remote control of the vehicle.

47. The robotic vehicle of claim 46, further comprising a retraction apparatus operable to move the spring member to at least the first, stored position.

48. The robotic vehicle of claim 47, wherein the retraction apparatus comprises a retraction mechanism coupled to the body, and a cable extending between the retraction apparatus and the spring member.

49. The robotic vehicle of claim 48, wherein the retraction apparatus is adapted to selectively retract and extend the cable.

50. The robotic vehicle of claim 47, wherein the retraction apparatus further comprises a latching mechanism operable to retain the spring member in the first, stored position.

51. The robotic vehicle of claim 46, wherein the body is cylindrical in shape.

52. The robotic vehicle of claim 46, wherein the two or more ground-engaging members are wheels located at opposite ends of the body.

53. A method for traversing one or more surfaces with a ground-engaging, robotic vehicle, the method comprising:

providing a ground-engaging, robotic vehicle, comprising:

a body, at least a first and a second ground-engaging member operatively coupled to the body, and a spring member coupled to the body, the spring member movable between at least a first, stored position and a second, extended position;

energizing one or both of the first and second ground-engaging members so that the ground-engaging robotic vehicle is propelled across a surface; and releasing the spring member from the first, stored position and striking the surface, with the spring member, with sufficient force to lift the robotic vehicle from the surface.

* * * * *

UNITED STATES PATENT AND TRADEMARK OFFICE
CERTIFICATE OF CORRECTION

PATENT NO.    : 6,548,982 B1
DATED         : April 15, 2003
INVENTOR(S)   : Papanikolopoulos et al.

It is certified that error appears in the above-identified patent and that said Letters Patent is hereby corrected as shown below:

Title page,
Item [75], Inventors, delete "Kathleen A. Griggs, Damascus, MD (US); Ellison C. Urban, II, Alexandria, VA (US)".

Column 20,
Line 25, delete "undetected" and replace with -- undeflected --.

Column 23,
Lines 9, 11 and 14, delete "for".
Line 27, after "movable," delete ",".

Signed and Sealed this

Twenty-third Day of September, 2003

JAMES E. ROGAN
*Director of the United States Patent and Trademark Office*